(12) United States Patent
Isobe et al.

(10) Patent No.: US 7,751,819 B2
(45) Date of Patent: Jul. 6, 2010

(54) CONTROLLING HANDOVER BETWEEN DIFFERENT PACKET NETWORKS BY USING COMMON PRIMITIVE MESSAGES TO MANAGE QOS

(75) Inventors: Shin-ichi Isobe, Yokosuka (JP); Kenji Nishimura, Yokosuka (JP); Takatoshi Okagawa, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 246 days.

(21) Appl. No.: 11/218,760

(22) Filed: Sep. 6, 2005

(65) Prior Publication Data

US 2006/0052107 A1    Mar. 9, 2006

(30) Foreign Application Priority Data

Sep. 7, 2004    (JP)    ............... P2004-260284

(51) Int. Cl.
*H04W 36/00*    (2009.01)
(52) U.S. Cl. .................... 455/436; 370/331
(58) Field of Classification Search ......... 455/436–444; 370/331–334
See application file for complete search history.

(56) References Cited

U.S. PATENT DOCUMENTS

| 5,771,275 | A * | 6/1998 | Brunner et al. | ............ 370/385 |
| 2003/0169719 | A1 * | 9/2003 | Isobe et al. | ................ 370/338 |
| 2003/0225892 | A1 | 12/2003 | Takusagawa et al. | |
| 2005/0271015 | A1 | 12/2005 | Nishida et al. | |
| 2007/0171867 | A1 * | 7/2007 | Kim | ............................ 370/331 |
| 2008/0026757 | A1 * | 1/2008 | Olvera-Hernandez | ....... 455/436 |

FOREIGN PATENT DOCUMENTS

| CN | 1467959 A | 1/2004 |
| EP | 0 920 230 A1 | 6/1999 |
| JP | 2002-159036 | 5/2002 |
| JP | 2003-319430 | 11/2003 |
| JP | 2004-032668 | 1/2004 |

OTHER PUBLICATIONS

Wei-Min Yao, Yaw-Chung Chen, "An Enhanced Buffer Management Scheme for Fast Handover Protocol", Proceedings of the 24th International Conference on Distributed Computing Systems Workshops, IEEE, Mar. 23, 2004.*
William Wolf, "Handover in Wireless ATM", Master of Science Thesis, XP-002463831, Tampere University of Technology Department of Information Technology, Jan. 1998, pp. 1,3, 14,34, 50,66, 81-82.
U.S. Appl. No. 11/218,760, filed Sep. 6, 2005, Isobe et al.

* cited by examiner

*Primary Examiner*—Nick Corsaro
*Assistant Examiner*—Vladimir Magloire
(74) *Attorney, Agent, or Firm*—Oblon, Spivak, McClelland, Maier & Neustadt, L.L.P.

(57) ABSTRACT

A mobile communication system of the present invention includes a handover control unit and a packet transfer network, which are independent of each other. The handover control unit selects a handover control system in accordance with a QoS. The handover control unit issues an instruction to the packet transfer network in accordance with the selected handover control system.

13 Claims, 18 Drawing Sheets

CONTROLLING HANDOVER BETWEEN DIFFERENT PACKET NETWORKS BY USING COMMON PRIMITIVE MESSAGES TO MANAGE QOS

CROSS REFERENCE TO RELATED APPLICATIONS

This application is based upon and claims the benefit of priority from the prior Japanese Patent Applications No. P2004-260284, filed on Sep. 7, 2004; the entire contents of which are incorporated herein by reference.

BACKGROUND OF THE INVENTION

1. Field of the Invention

The present invention relates to a mobile communication system, a hand over controller, and a hand over controlling method.

2. Description of the Related Art

In recent years, there has been proposed a method of implementing a "high-quality handover control" by expanding the Mobile IPv6 (see D. Johnson, C. Perkins, and J. Arkko, "Mobility Support in IPv6", RFC3775, June, 2004, for example) as a typical protocol providing a mobility on the Internet based upon the IETF (Internet Engineering Task Force). Such a high-quality handover control is realized by, for example, the Hierarchical Mobile IPv6 (HMIP) in which a node called a mobility anchor point (MAP) is introduced into a mobile communication system to shorten a location registration period (see H. Soliman, C. Catelluccia, K. E L Malki, and L. Bellier, "Hierarchical Mobile IPv6 mobility management (HMIPv6)", Internet Draft: draft-ietf-mipshop-hmipv6-02.txt, June, 2004, for example).

However, in a conventional mobile communication system, one high-quality handover control system is employed in one packet transfer network. Therefore, the packet transfer network accessed by a mobile node is not always capable of handover control meeting a service quality desired by the mobile node or a service quality commensurate with traffic.

For example, in some cases, once the mobile node is moved to a packet transfer network that makes a handover control different from a desired one, the mobile node cannot receive a high-quality handover control. To be specific, as shown in FIG. 1, when a mobile node requiring a fast handover accesses a packet transfer network that gives a handover control suitable for preventing a packet loss, the service quality desired by the mobile node is not always guaranteed. In contrast, when a mobile node requiring reduction in packet loss accesses a packet transfer network that gives a fast handover control, the service quality desired by the mobile node is not always guaranteed.

BRIEF SUMMARY OF THE INVENTION

It is therefore an object of the present invention to provide a mobile communication system, a handover controller, and a handover controlling method, which enable handover control commensurate with a service quality desired by a mobile node.

A mobile communication system according to the present invention includes: an access router included in a packet transfer network and which is accessed by a mobile node; and a handover control unit configured to select one of a plurality of control systems of handover for switching the access router accessed by the mobile node, and to issue an instruction of the handover to the packet transfer network in accordance with the selected control system.

According to the mobile communication system, a handover control system can be selected depending on a service quality desired by a mobile node, thus making it possible to provide a handover control commensurate with the desired service quality. Besides, in the mobile communication system, a handover control unit and a packet transfer network are independent of each other, and the handover control unit issues an instruction to the packet transfer network in accordance with the selected handover control system, whereby a handover control commensurate with a service quality desired by a mobile node can be flexibly made.

It is preferable that the handover control unit issue the instruction using a message usable in common among a plurality of handover control systems.

The mobile communication system further includes a control system storage unit configured to store the service quality in association with the handover control system, in which the handover control unit preferably selects the handover control system according to the control systems stored in the control system storage unit.

A handover controller according to the present invention includes a handover control unit configured to select one of a plurality of control systems of handover for switching an access router accessed by a mobile node in accordance with a service quality, and to issue an instruction of the handover to a packet transfer network which includes the access router in accordance with the selected control system.

A handover controlling method according to the present invention includes: selecting a control system of handover for switching an access router accessed by a mobile node in accordance with a service quality; and to issue an instruction of the handover to a packet transfer network which includes the access router in accordance with the selected control system.

That is, according to the present invention, it is possible to provide a mobile communication system, a handover controller, and a handover controlling method, which enable handover control commensurate with a service quality desired by a mobile node.

DESCRIPTION OF THE PREFERRED EMBODIMENTS

Mobile Communication System

Figure 1:
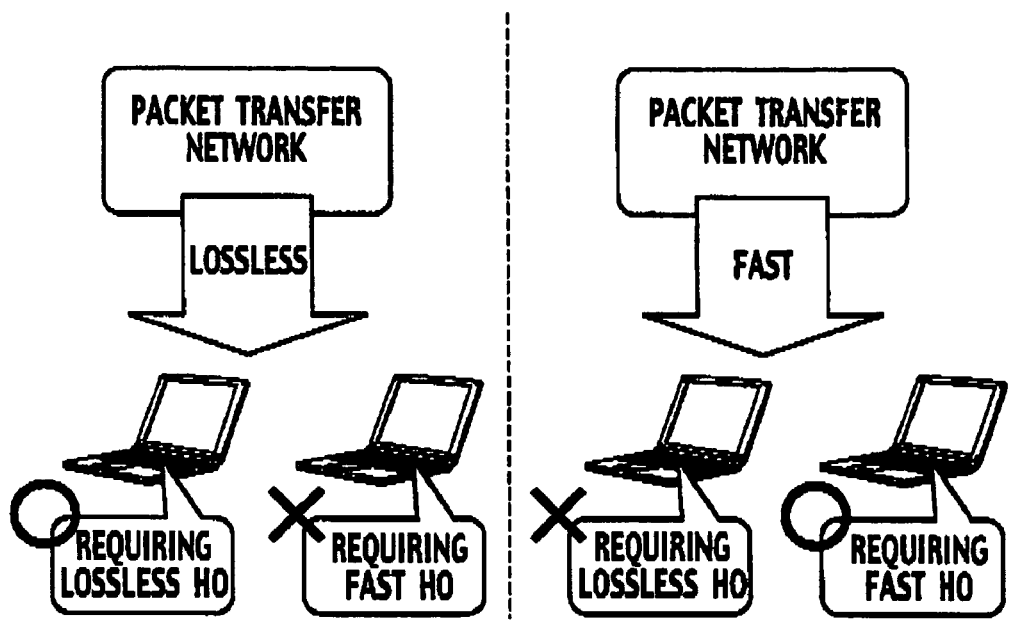
FIG. 1 is an explanatory view illustrative of a problem to be solved.
Figure 2:
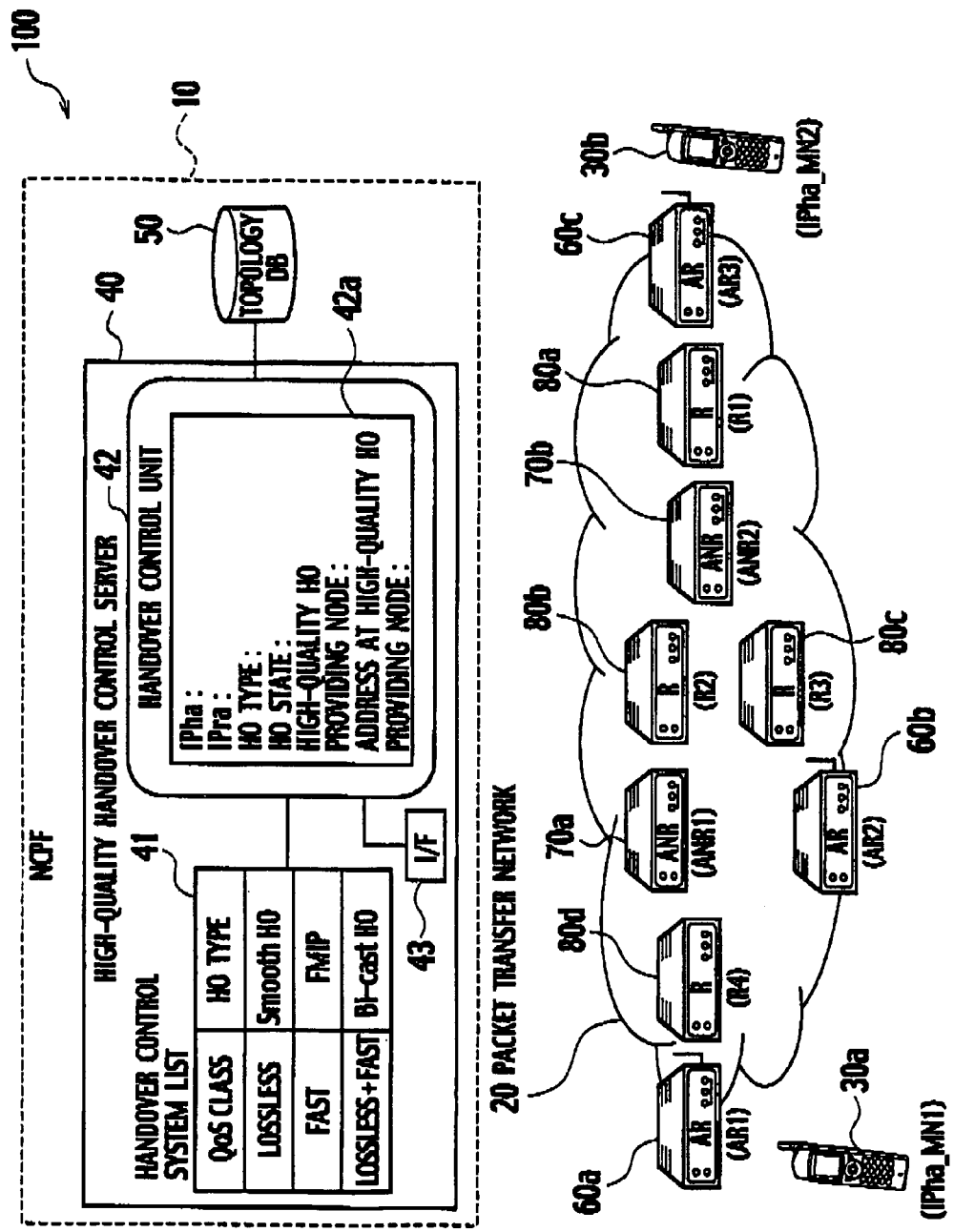
FIG. 2 is a diagram showing a mobile communication system according to an embodiment of the present invention.

A mobile communication system 100 of FIG. 2 adopts an IP-based IMT network platform (IP2) (see T. Okagawa et al., "Basic Primitives and Packet Transmission Mechanism in IP2", Technical Report of IEICE, November, 2002) which has been under study as a next-generation mobile communication network architecture.

The mobile communication system 100 includes an NCPF (network control platform) 10, and a packet transfer network 20. The NCPF 10 makes a control such as a mobility control, a quality-of-service (hereinafter referred to as "QoS") control, a session control or the like. The packet transfer network 20 processes a packet such as transferring a packet (hereinafter referred to as "forwarding"), accumulating packets (hereinafter referred to as "buffering"), and copying a packet (hereinafter referred to as "copy").

In this way, the mobile communication system 100 adopts an architecture in which the NCPF 10 fulfilling an intelligent function is configured independent of the packet transfer network 20 intended for simple packet processing.

The transfer network 20 includes plural access routers (hereinafter referred to as "ARs") 60a to 60c, plural advanced anchor routers (hereinafter referred to as "ANR") 70a and 70b, and plural routers (hereinafter referred to as "Rs") 80a to 80d. The ARs 60a to 60c are accessed by mobile nodes (hereinafter referred to as "MNs") 30a and 30b. The ANRs 70a and 70b execute packet forwarding, buffering, and copy, and exert the same functions as that of the ARs 60a to 60c. Thus, the ANRs 70a and 70b provide a high-quality handover control. The Rs 80a to 80d relay packets in the packet transfer network 20. FIG. 2 shows the ARs 60a to 60c, the ANRs 70a and 70b, the Rs 80a to 80d, and the MNs 30a and 30b, together with their respective IP addresses.

The NCPF 10 includes a high-quality handover control server 40 and a topology database (hereinafter referred to as "topology DB") 50. The topology database 50 stores topologies of the packet transfer network 20. The high-quality handover control server 40 is a handover controller that makes a handover control. The high-quality handover control server 40 executes a high-quality mobility control in consideration of a QoS in addition to basic mobility control based on the IP2. The high-quality handover control server 40 includes a handover control system list 41, a handover control unit 42, and an interface (hereinafter referred to as "I/F") 43.

Hereinafter, a detailed description is given of each component of the high-quality handover control server 40. The handover control system list 41 is a control system storage unit for storing a QoS in association with each other a handover control system. More specifically, the handover control system list 41 stores a QoS class associated with a handover (HO) type indicating a handover control system. The handover control system list 41 stores the QoS class in association with the handover control system meeting the QoS. That is, the handover control system list 41 stores mapped QoS class and handover control system.

Examples of the handover control system (HO type) include buffering handover (HO), fast handover (HO), and a combined system of the buffering handover and the fast handover. The buffering handover prevents a packet loss during handover by buffering packets of an MN during the handover. The buffering handover is, for example, a smooth handover (HO) or an ANR buffering handover (HO).

The smooth handover prevents a packet loss during handover by buffering packets of an MN during handover at an AR that the MN accessed before the handover (see G. Krishnamurthi, R. Chalmers, and C. Perkins, "Buffer Management for Smooth Handovers in IPv6", Internet Draft: draft-krishnamurthi-mobileip-buffer6-01.txt, March, 2001).

The ANR buffering handover prevents a packet loss during handover by buffering packets of an MN during the handover at an ANR in the packet transfer network 20 (see S. Isobe, A. Iwasaki, K. Igarashi, and M. Yabusaki, "Handover with Pro-active Anchor Router Relocation and Data Buffering", IEICE transactions on communications, Special Section on Mobile Multimedia Communications, May, 2004).

The fast handover shortens an instantaneous interruption period by acquiring an address assigned to the MN after the handover, prior to the handover. The fast handover is, for example, FMIP (fast handover for mobile IPv6) (see R. Koodli, "Fast Handovers for Mobile IPv6", Internet Draft: draft-ietf-mipshop-fast-mipv6-01.txt, January, 2004).

The combined system of the fast handover and the buffering handover is, for example, a bi-cast handover (HO). The bi-cast handover acquires an address assigned to an MN after the handover, prior to the handover and copies packets of the MN during the handover at any node in the packet transfer network 20 to transfer the packets to both an AR accessed by the MN before the handover and an AR accessed by the MN after the handover. That is, the bi-cast handover shortens an instantaneous interruption period and prevents a packet loss during handover (see K. El Malki, H. Soliman, "Simultaneous Bindings for Mobile IPv6 Fast Handovers", Internet Draft: draft-elmalki-mobileip-bioasting-v6-05.txt, October, 2003). Note that the handover control system is not limited to this, and various control systems may be used.

The QoS class includes a "lossless" class requiring elimination or reduction of packet loss, a "fast" class requiring a shorter instantaneous interruption period upon the handover, and a "lossless+fast" class requiring both of them.

The handover control system list 41 stores, for example, the QoS class "lossless" in association with the buffering handover such as "smooth handover" or "ANR buffering handover". Further, the handover control system list 41 stores, for example, the QoS class "fast" in association with the fast handover such as "FMIP". Further, the handover control system 41 stores, for example, the QoS class "lossless+fast" in association with a combined system of the fast handover and the buffering handover such as the bi-cast handover.

The handover control unit 42 selects a handover control system switching an AR that the MN accesses, based on the QoS, and issues an instruction about the handover to the packet transfer network 20 in accordance with the selected control system. The handover control unit 42 makes a high-quality mobility control in consideration of the QOS as well as a basic mobility control based on the IP2.

The handover control unit 42 includes a control information storage unit 42a storing control information used for handover control. The control information storage unit 42a stores control information for each MN. The control information storage unit 42a stores an IP host address (hereinafter referred to as "IPha"), an IP routing address (hereinafter referred to as "IPra"), an HO type, an HO state, a high-quality HO providing node, and an address at a high-quality HO providing node.

The IPha is an IP address specific to an MN for identifying the MN. The IPra is an address assigned by the AR that the MN accesses and used for forwarding packets. The IPra is also used as a locator indicating a location of the MN in the network. In some cases, an IP address assigned to the MN by the ANR is used as the IPha at the ANR. Further, an IP address assigned to an MN by the ANR may be used as an IPra. The HO type indicates a handover control system selected by the handover control unit 42. The MN is given a handover control based on the handover control system selected as the HO type.

The HO state indicates a handover control state, for example, how to process packets during handover (forwarding, buffering, copy, or the like). The high-quality HO providing node indicates a node that performs the processing for handover control, and executes a high-quality handover control. An address of an MN at the high-quality HO providing node is an IP address assigned to the MN by the high-quality HO providing node.

The handover control unit 42 records control information in a control information storage unit 42a. The handover control unit 42 references the control information storage unit 42a for handover control. The handover control unit 42 selects a handover control system (HO type) with reference to the handover control system list 41.

The handover control unit 42 gives an instruction about handover to the packet transfer network 20 using a message usable in common among plural handover control systems. To elaborate, the handover control unit 42 sends such a message to the ARs 60a to 60c or the ANRs 70a and 70b of the packet transfer network 20 through the I/F 43. The message usable in common among plural handover control systems is typified by a Primitive in the IP-based IMT Network Platform (IP2) (see T. Okagawa, et al., "Basic Primitives and packet transmission mechanism in IP2", Technical Report of IEICE, November, 2002).

Further, the handover control unit 42 defines a new primitive for realizing a high-quality handover control. More specifically, defined as the new primitive are a forwarding primitive 3, a buffering primitive 4, and a copy primitive 5 shown in FIG. 3.

The forwarding primitive 3 is used for issuing an instruction to forward packets between the AR 60a to 60c and the ANRs 70a, 70b. That is, the forwarding primitive 3 is used for issuing an instruction to forward packets from an ANR or AR to another ANR or AR.

The buffering primitive 4 is used for issuing an instruction to buffer designated packets in the ARs 60a to 60c and the ANRs 70a, 70b in the packet transfer network 20. The copy primitive 5 is used for issuing an instruction to copy designated packets to the ARs 60a to 60c and the ANRs 70a, 70b in the packet transfer network 20.

Figure 3:
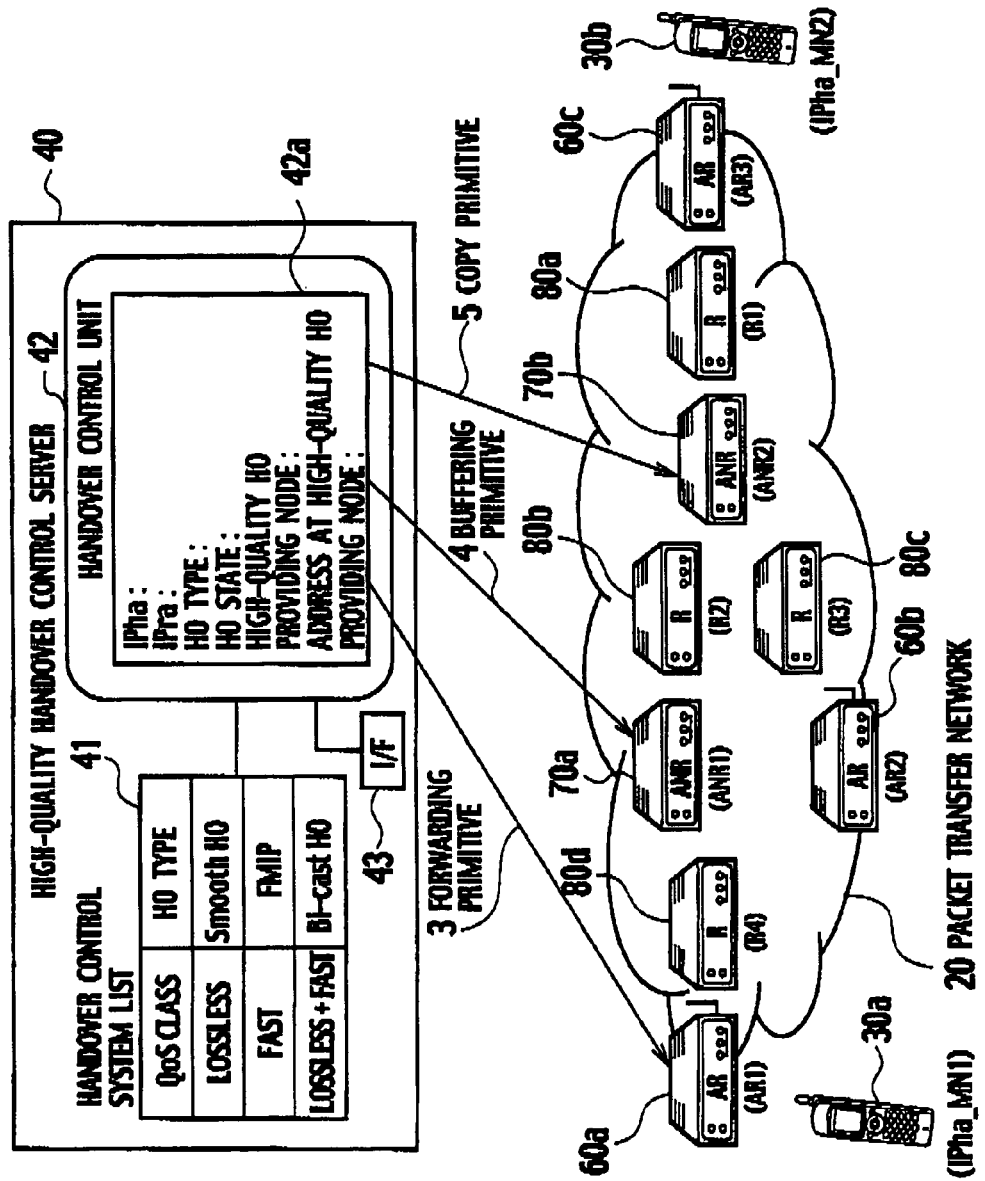
FIG. 3 shows primitives according to the embodiment of the present invention.

Although not shown in FIG. 3, the ARs 60a to 60c and the ANRs 70a, 70b send an acknowledgement message in response to the received primitive, to the high-quality handover control server 40.

Figure 4:
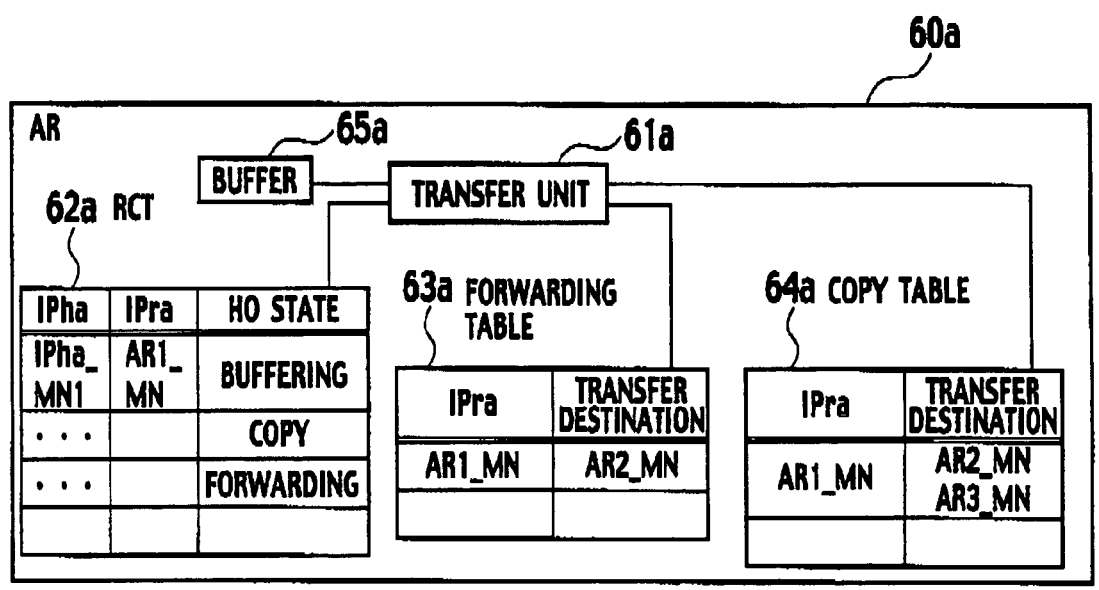
FIG. 4 is a block diagram showing an AR according to the embodiment of the present invention.

Referring to FIG. 4, the configurations of the ARs 60a to 60c and the ANRs 70a, 70b are described in detail. The AR60a includes a transfer unit 61a, a routing cache table (RCT) 62a, a forwarding table 63a, a copy table 64a, and a buffer 65a. The ARs 60b, 60c, and the ANRs 70a, 70b include a transfer unit, an RCT, a forwarding table, a copy table, and a buffer similar to the AR 60a.

The RCT 62a stores the IPha, IPra, and HO state in association with each other. An association between the IPha and the IPra is used for mutually translating the IPha and the IPra upon transferring packets similar to the basic mobility control based on the IP2. The HO state is an expanded one of the basic mobility control, which is used for executing a high-quality handover control. The field of the HO state stores how the AR 60a processes packets (forwarding, buffering, copy, or the like).

The forwarding table 63a stores the IPra of a packet to be forwarded, in association with its transfer destination address. The copy table 64a stores the IPra of a packet to be copied, in association with its transfer destination addresses.

In FIG. 4, the forwarding table 63a and the copy table 64a are separately provided, but a common table that serves as both the forwarding table and the copy table may be provided. Regarding the MN whose HO state in the RCT 62a is forwarding, the IPra of a packet to be forwarded, and one transfer destination address thereof may be registered in the common table. Regarding the MN whose HO state is copy, the IPra of a packet to be copied, and plural transfer destination addresses thereof may be registered in the common table.

The transfer unit 61a receives a packet from another router (ARs 60b, 60c, ANRs 70a, 70b, or Rs 80a to 80d). The transfer unit 61a references the HO state in the RCT 62a. If no HO state is set, the transfer unit 61a references an association between the IPha and the IPra in the RCT 62a, similar to the basic mobility control based on the IP2, and translates the address and transfers the received packet if required.

If the HO state is forwarding, the transfer unit 61a references the forwarding table 63a, and transfers the received packet to a transfer destination address of the packet to be forwarded. If the HO state is copy, the transfer unit 61a references the copy table 64a, copies the received packet, and transfers the received packet and the copied packet to the transfer destination addresses for the packet to be copied. If the HO state is buffering, the transfer unit 61a stores the received packets in the buffer 65a to be buffered in the AR 60a.

Next, detailed description is given of how to select a handover control system and how to control handover based on the selected handover control system. Firstly, referring to FIG. 5, the way to select a handover control system is described. The handover control unit 42 determines a handover control system based on a QoS designated by the MN 30a, for example.

In the mobile communication system 100 based on the IP2, the MN 30a, which accesses the AR 60a to start communication, sends an Activation 1 for notifying the packet transfer network 20 that the MN has accessed the AR 60a. The MN 30a includes a communication unit 31 and a control unit 32. The control unit 32 creates the Activation 1 or other such notifications. The communication unit 31 sends the created notification to the accessed AR 60a.

Figure 5:
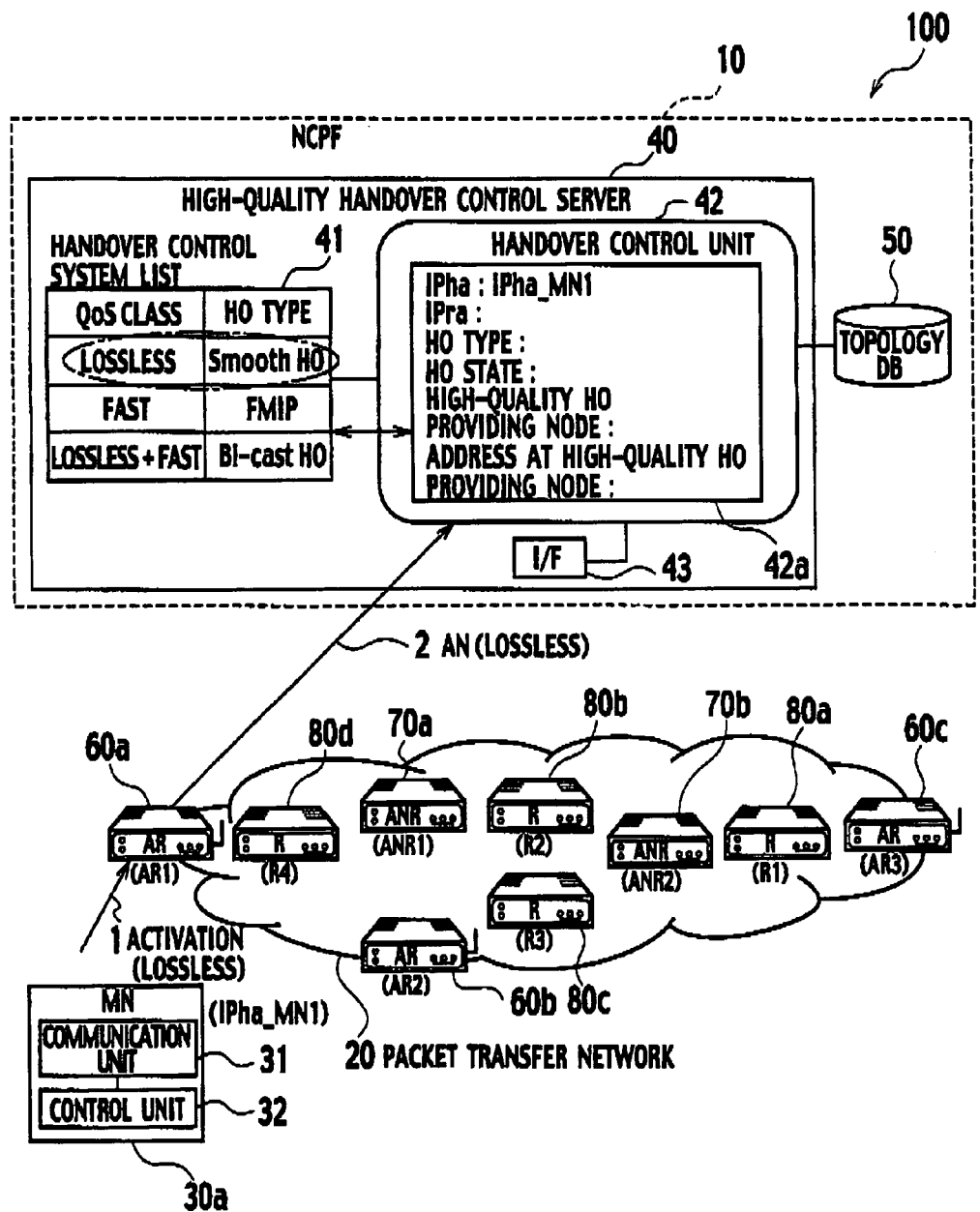
FIG. 5 shows how to select a handover control system according to the embodiment of the present invention.

The control unit 32 creates the Activation 1 indicating a QoS class desired by the MN 30a for the next communication, and sends the Activation 1 to the packet transfer network 20 through the communication unit 31. Hence, the MN 30a notifies the packet transfer network 20 of a desired QoS class. For example, when the MN 30a starts communication requiring elimination of packet loss such as the file transfer, as shown in FIG. 5, the control unit 32 can create the Activation 1 indicating the "lossless" as the QoS class. For example, when the MN 30a starts communication such as voice communication requesting to shorten the instantaneous interruption period as much as possible, the control unit 32 can create the Activation 1 indicating "fast" as the QoS class. The MN 30a may set a QoS class specified in the packet transfer network 20, as the Activation 1 instead of designating "lossless" or the like as the QoS class indicating specific QoS contents.

The transfer unit 61a of the AR 60a having received the Activation 1 sends an AN (activate notification) to the high-quality handover control server 40 to notify the server that the MN 30a accesses the AR 60a to start communication. The transfer unit 61a sets a QoS class preset in the Activation 1 received by the MN 30a, in the AN 2. In FIG. 5, the transfer unit 61a creates an AN 2 indicating the "lossless" as the QoS class. Hence, the AR 60a notifies the packet transfer network 20 of the QoS class desired by the MN 30a.

The handover control unit 42 receives the AN 2 through the I/F 43. The handover control unit 42 selects a handover control system based on a QoS class in the AN 2. More specifically, the handover control unit 42 searches for the handover control system list 41 based on the notified QoS class to select a handover control system (HO type) associated with the QoS class. Thus, the handover control unit 42 selects a control system in cooperation with the handover control system list 41.

In FIG. 5, the handover control unit 42 selects a buffering handover such as a smooth handover as the handover control system (HO type) based on the "lossless" as the QoS class, which is required of the MN 30a.

The handover control unit 42 registers the selected handover control system (HO type) in the control information storage unit 42a. The handover control unit 42 makes a handover control in accordance with the handover control system (HO type) registered in the control information storage unit 42a upon the handover of the MN 30a. Further, when receiving the new notification of the QoS class from the MN 30a, the handover control unit 42 may update the control information storage unit 42a. The handover control unit 42 makes a control between an NCPE, an IP, and a BB.

The handover control unit 42 may select a handover control system in consideration of not only a wireless access system accessed by the MN, but also the QoS. For example, when the wireless access system accessed by the MN is accessible through plural wireless links, it is possible to execute such a handover control as to transfer packets through plural paths to avoid a packet loss even in the packet transfer network 20 (see Nishimura et al., "Soft Handover Control using Optimum Path in IP-based Mobile Network", Technical Report of IEICE, Vol. 102, No. 692, pp. 323-326, March 2003). Besides, the handover control unit 42 can select a handover control system in consideration of contract information of MN's user or the like.

In these cases, the MN 30a may set a wireless access system that it will access, to the Activation 1, in addition to the QoS class. Alternatively, the handover control unit 42 may acquire user's contract information or information about a wireless access system that a user will access, from a server for managing the user's contract information or a server managing the information about the wireless access system.

Further, a control server for controlling QoS or session between MNs may be provided inside the NCPF 10. The control server can manage an MN's communication type, a traffic type, and a QoS desired by the MN. Hence, the handover control unit 42 may select a handover control system in response to a notification about a QoS, communication type, or traffic type from the control server in addition to the Activation 1 from the MN of FIG. 5. In this way, the handover control unit may select a control system based on not only the notification from the MN but also the notification from the control server. That is, the handover control unit 42 may select a control system for each MN in accordance with a QoS desired by the MN or a QoS notified by the control server.

Referring to FIGS. 6 to 17, a specific control based on the selected handover control will be described in detail. In the following explanation about an operation, it is assumed that the MN 30a accesses the packet transfer network 20, and a handover control system (HO type) is selected and registered in the control information storage unit 42a. Further, the explanation is made taking as an example the case in which a corresponding node (CN) of the MN 30a is the MN 30b when such a handover as to switch the AR accessed by the MN 30a is switched from the AR 60a (P_AR) to the AR 60b (N_AR).

(Smooth Handover (HO))

Figure 6:
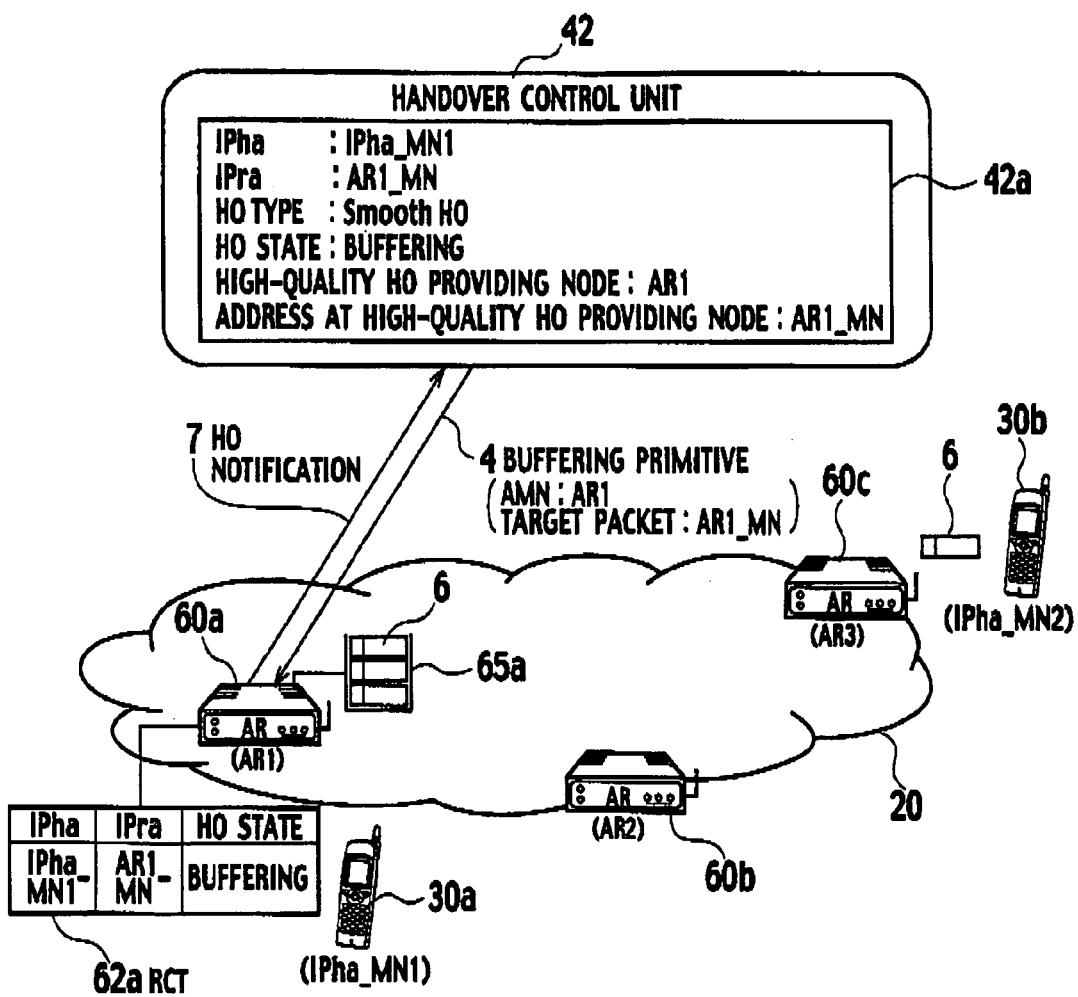
FIG. 6 shows a procedure from handover notification to start of buffering in a smooth handover according to the embodiment of the present invention.

If smooth handover is selected as a control system, as shown in FIG. 6, "smooth handover" is registered in the control information storage unit 42a as a handover control system (HO type) for the MN 30a. The smooth handover is a control system for buffering packets of the MN 30a during the handover in the AR 60a that the MN accessed before the handover.

Therefore, the handover control unit 42 registers an address "AR1" of the AR 60a, and an IPra "AR1_MN" assigned to the MN 30a by the AR 60a as an address at a high-quality HO providing node in the control information storage unit 42a. FIG. 6 shows a procedure from the handover notification upon the smooth handover to the start of buffering. In FIG. 6, the MN 30a accesses the AR 60a, so the "AR1_MN" assigned to the MN 30a by the AR 60a is registered as an IPra in the control information storage unit 42a.

The transfer unit 61a of the AR 60a detects that the MN 30a comes near to handover based on wireless information about wireless communication of the MN 30a, for example, signal intensity of the MN 30a. The transfer unit 61a sends the handover notification 7 to the effect that the MN 30a comes near to handover, to the high-quality handover control server 40.

The handover control unit 42 of the high-quality handover control server 40 having received the handover notification 7 sets "buffering" as the HO state in the control information storage unit 42a. Then, the handover control unit 42 instructs the AR 60a (P_AR) to buffer packets addressed to the MN 30a. To be specific, the handover control unit 42 sets an "AR 1" for the AMN as an instruction target, and sends a buffering primitive 4 that defines "AR1_MN" for a target packet as a buffering target, to the packet transfer network 20.

The transfer unit 61a of the AR 60a having received the buffering primitive 4 sets "buffering" as the HO state of the MN 30a in the RCT 62a. That is, the transfer unit 61a sets "buffering" in the field of the HO state associated with the IPha "IPha_MN1" and the IPra "AR1_MN" in the RCT 62a.

After the setting, the transfer unit 61a references the PCT 62a when receiving a packet, and stores a packet addressed to the IPha "IPha_MN1" registered in the RCT 62a, in the buffer 65a. In this way, the transfer unit 61a stores and buffers packets 6 sent to the MN 30a from the MN 30b as the corresponding node, in the buffer 65a.

Figure 7:
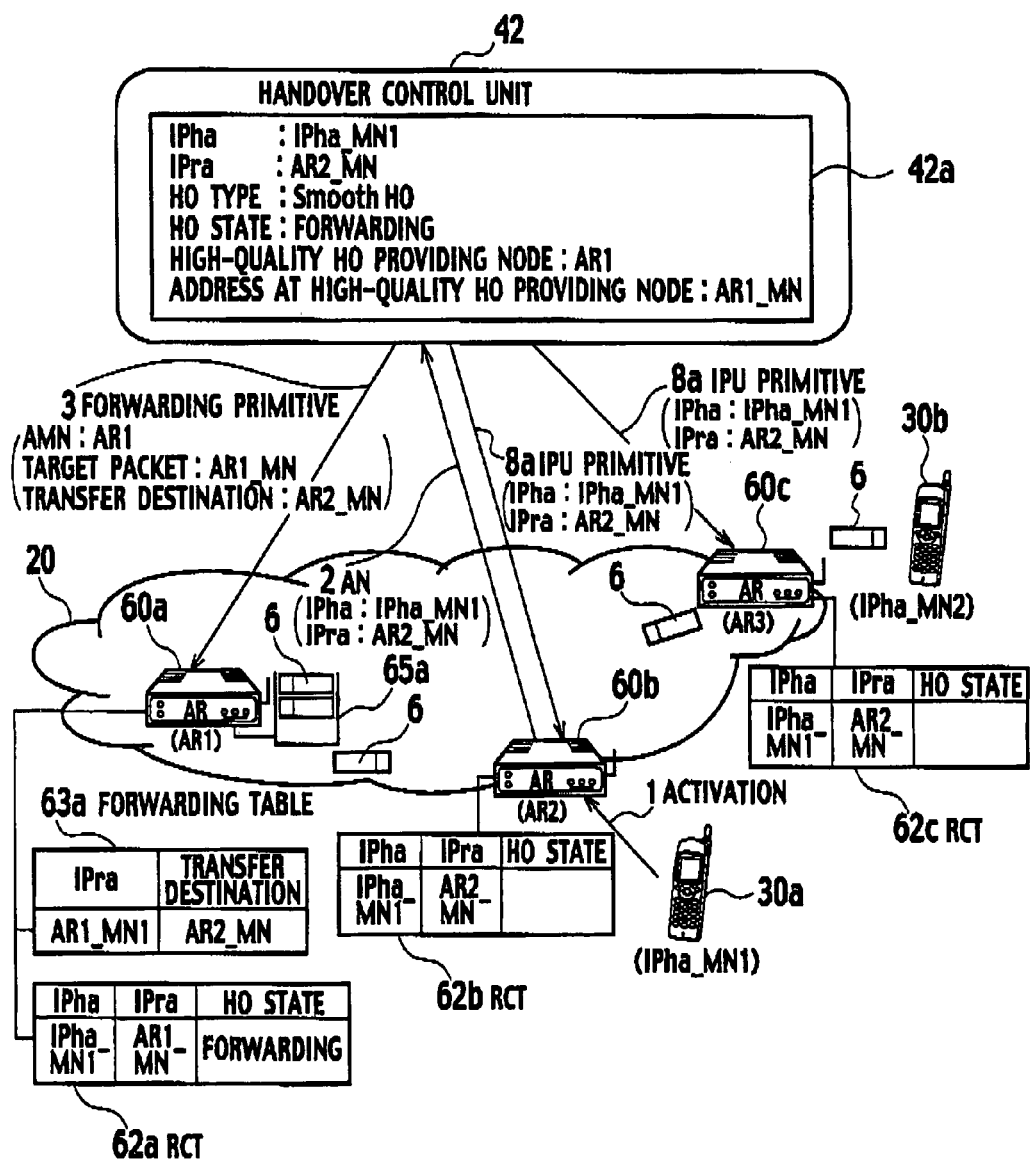
FIG. 7 shows a procedure from handover completion to start of forwarding in the smooth handover according to the embodiment of the present invention.

FIG. 7 shows a procedure from the handover completion to the start of forwarding, upon the smooth handover. The MN 30a executes handover for switching an accessed AR from the AR 60a to the AR 60b. The MN 30a sends to the AR 60b (N_AR) which the MN 30b newly accessed, the Activation 1 notifying the MN has accessed the AR 60b through the handover. The MN 30a can send the Activation 1 in accordance with a procedure of the basic mobility control operation based on the IP2.

The transfer unit of the AR 60b having received the Activation 1 temporarily assigns the IPra "AR2_MN" to the MN 30a. The transfer unit notifies the high-quality handover control server 40 that the MN 30a has accessed the AR 60b. More specifically, the transfer unit sends the AN 2 including the IPra "AR2_MN" assigned with respect to the IPha "IPha_MN 1" of the MN 30a, to the high-quality handover control server 40.

The handover control unit 42 updates the IPra stored in the control information storage unit 42a to the IPra "AR2_MN" assigned by the AR 60b (N_AR) based on the received AN 2. Further, the handover control unit 42 updates the HO state in the control information storage unit 42a from "buffering" to "forwarding".

Then, the handover control unit 42 instructs the AR 60b to register the IPra and IPha of the MN 30a in the RCT 62b in the AR 60b. More specifically, the handover control unit 42 sends to the packet transfer network 20, an IPU (IF update) primitive 8a instructing to register the "IPha_MN1" and the "AR2_MN" in association with each other. The transfer unit of the AR 60b, that has received the IPU primitive 8a, registers an association between the IPha_MN1" and "AR2_MN" in the RCT 62b.

Further, the handover control unit 42 instructs the AR 60a (P_AR) to forward (transfer) packets of the MN 30a to the AR 60b (N_AR). More specifically, the handover control unit 42 sends to the packet transfer network 20, the forwarding primitive 3 that defines the "AR1" for the AMN as an instruction target, defines the "AR1_MN" for a target packet as a forwarding target, and defines the "AR2_MN" for the transfer destination.

The transfer unit 61a of the AR 60a having received the forwarding primitive 3 registers the IPra "AR1_MN" of a packet to be forwarded, in association with an address "AR2_MN" of the AR 60b as the transfer destination, in the forwarding table 63a. Further the transfer unit 61a updates the HO state of the MN 30a in the RCT 62a from "buffering" to "forwarding". That is, the transfer unit 61a sets "forwarding" in the field of HO state associated with the IPha "IPha_MN1" and IPra "AR1_MN" in the RCT 62a.

Firstly, the transfer unit 61a of the AR 60a transfers packets 6 addressed to the MN 30a and stored in the buffer 65a to the AR 60b with reference to the RCT 62a. Further, the transfer unit 61a references the RCT 62a, when receiving the packets 6 sent to the MN 30a from the MN 30b as the corresponding node, to transfer the packets to the AR 60b. That is, the packets 6 sent from the MN 30b to the MN 30a are transferred to the AR 60b through the AR 60b and the AR 60a.

Thereafter, the handover control unit 42 instructs the AR 60 to register a new association between an IPha and an IPra of the MN 30a in the RCT 62c of the AR 60c. To elaborate, the handover control unit 42 sends the IPU primitive 8a instructing to register the "IPha_MN1" in association with the "AR2_MN" assigned at the handover destination, to the packet transfer network 20. The transfer unit of the AR 60c having received the IPU primitive 8a registers an association between the "IPha_MN1" and the "AR2_MN" in the RCT 62c and updates the RCT 62c. Hence, the packets 6 sent from the MN 30b to the MN 30a are transferred to the AR 60b through the AR 60c, without going through the AR 60a.

Figure 8:
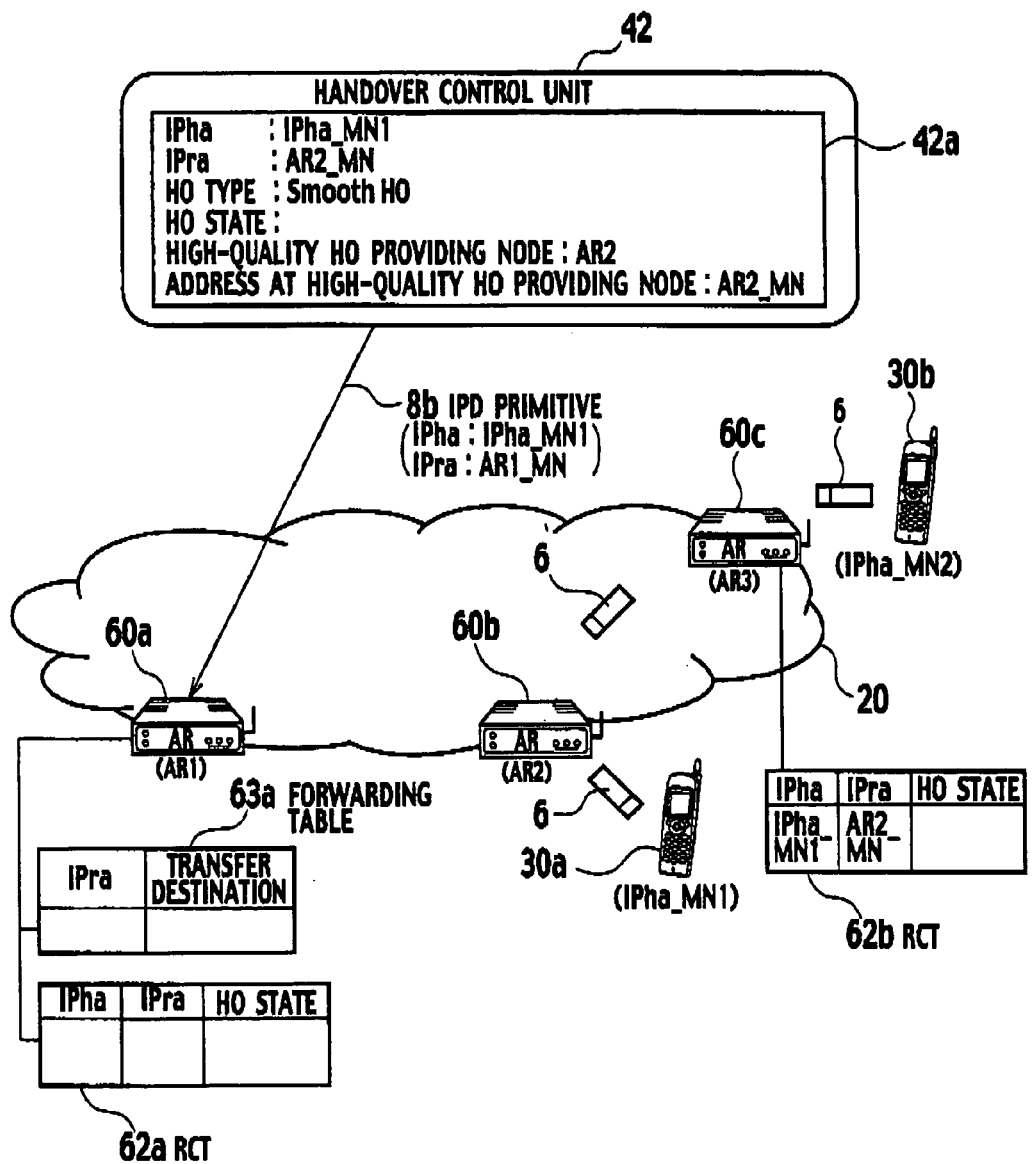
FIG. 8 shows a procedure executed after the completion of forwarding in the smooth handover according to the embodiment of the present invention.
Figure 9:
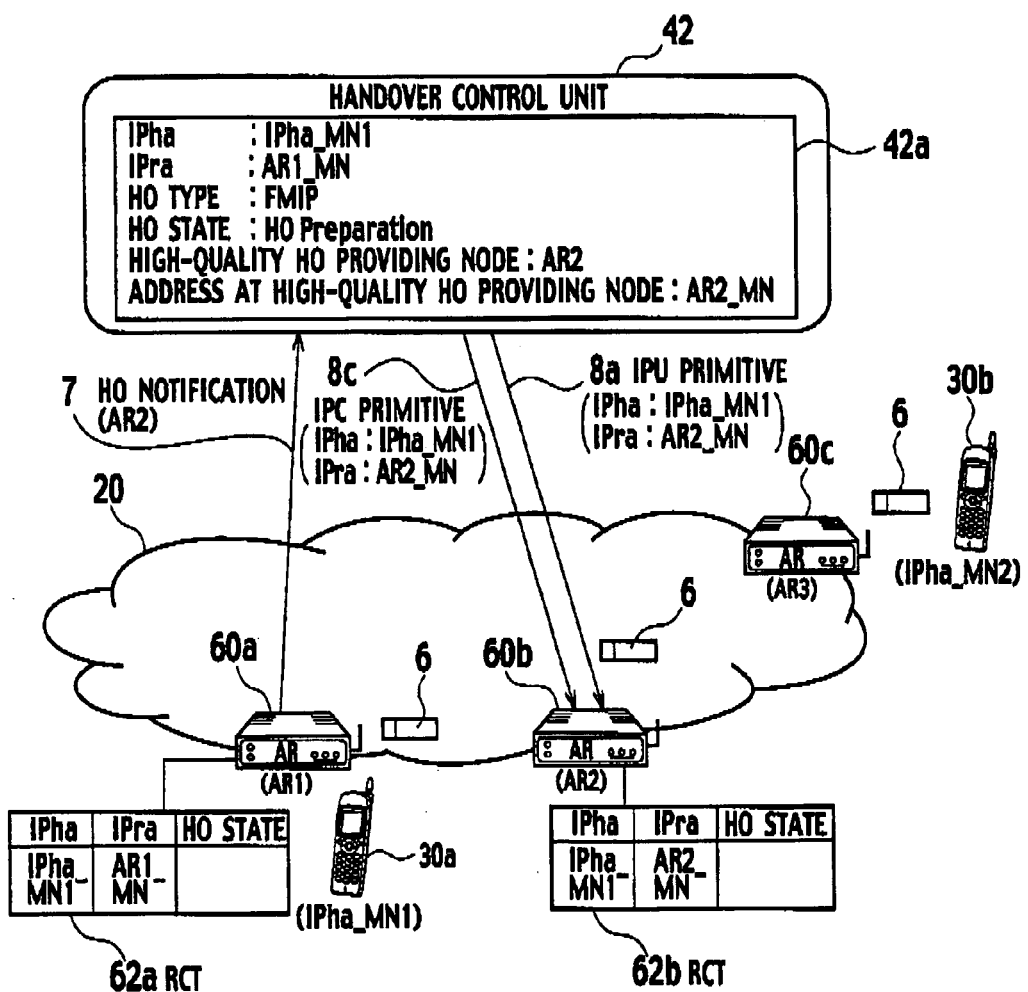
FIG. 9 shows a procedure from the handover notification to acquisition of IPra at a handover destination in FMIP according to the embodiment of the present invention.

FIG. 8 shows a procedure of the smooth handover after the completion of forwarding. When the RCT 62c of the AR 60c is updated, packets addressed to the MN 30a are no longer transferred to the AR 60a. Thus, the handover control unit 42 instructs the AR 60a to delete information about the MN 30a from the RCT 62a. More specifically, the handover control unit 42 sends to the packet transfer network 20, an IPD (IP delete) primitive 8b instructing to delete an association between the "IPha_MN1" and the "AR1_MN".

The transfer unit 61a of the AR 60a having received the IPD primitive 8b deletes an association between the "IPha_MN1" and "AR1_MN" from the RCT 62a. Further, the transfer unit 61a deletes an association between the "AR1_MN" and the "AR2_MN" from the forwarding table 63a.

Through the above, the processing for handover is completed. Thus, the handover control unit 42 deletes the HO state set in the control information storage unit 42a. Further, in the smooth handover, the AR 60b that is now accessed by the MN 30a is the next high-quality HO providing node. Hence, the handover control unit 42 registers an address "AR2" of the AR 60b as the high-quality HO providing node, and the IPra "AR2_MN" assigned to the MN 30a by the AR 60b as an address at the high-quality HO providing node in the control information storage unit 42a.

(FMIP)

When an FMIP is selected as a control system, as shown in FIG. 8, "FMIP" is registered in the control information storage unit 42a as the handover control system (HO type) for the MN 30a. The FMIP is a control system in which the IPra of the MN 30a to be used after the handover is acquired before the handover from the AR as the handover destination. The processing from the acquisition of the IPra before the handover to the completion of the handover is referred to as "HO preparation".

FIG. 8 shows a procedure from the handover notification to the acquisition of the IPra at the handover destination in the FMIP. In FIG. 8, since the MN 30a accesses the AR 60a, the "AR1_MN" assigned to the MN 30a by the AR 60a as the IPra is registered in the control information storage unit 42a.

The transfer unit 61a of the AR 60a detects that the MN 30a comes near to the handover based on the wireless information about wireless communication of the MN 30a based on the signal intensity of the MN 30a for example. At this time, the transfer unit 61a predicts which AR to become a handover destination based on the wireless information. The transfer unit 61a sends the handover notification 7 indicating that the MN 30a comes near to handover, and indicating the address "AR2" of the AR 60b as the predicted handover destination, to the high-quality handover control server 40.

The handover control unit 42 of the high-quality handover control server 40 receiving the handover notification 7 sets the "HO preparation" as the HO state of the control information storage unit 42a. Further, the handover control unit 42 registers the address "AR2" of the AR 60b as the notified handover destination as the high-quality HO providing node in the control information storage unit 42a. Also, the handover control unit 42 registers an IPra "AR2_MN" used by the MN 30a at the AR 60b as the address at the high-quality HO providing node, in the control information storage unit 42a.

The handover control unit 42 requires the AR 60b as the handover destination to instruct the MN 30a to use the IPra "AR2_MN" registered in the control information storage unit 42a under the control of the AR 60b. More specifically, the handover control unit 42 sends an IPC (IP create) primitive 8c requesting to assign the "AR2_MN" with respect to the IPha "IPha_MN1" of the MN 30a, to the packet transfer network 20.

The transfer unit of the AR 60b receiving the IPC primitive 8c judges whether or not the "AR2_MN" is effective and assignable at the AR 60b. The transfer unit sends an acknowledgement message in response to the IPC primitive 8c, to the high-quality handover control server 40, if it is judged effective.

The handover control unit 42 receiving the acknowledge message sends the IPU primitive 8a instructing to register the "IPha_MN1" in association with the "AR2_MN" to the packet transfer network 20. The transfer unit of the AR 60b receiving the IPU primitive Sa registers an association between the "IPha_MN1" and "AR2_MN" in the RCT 62b.

Figure 10:
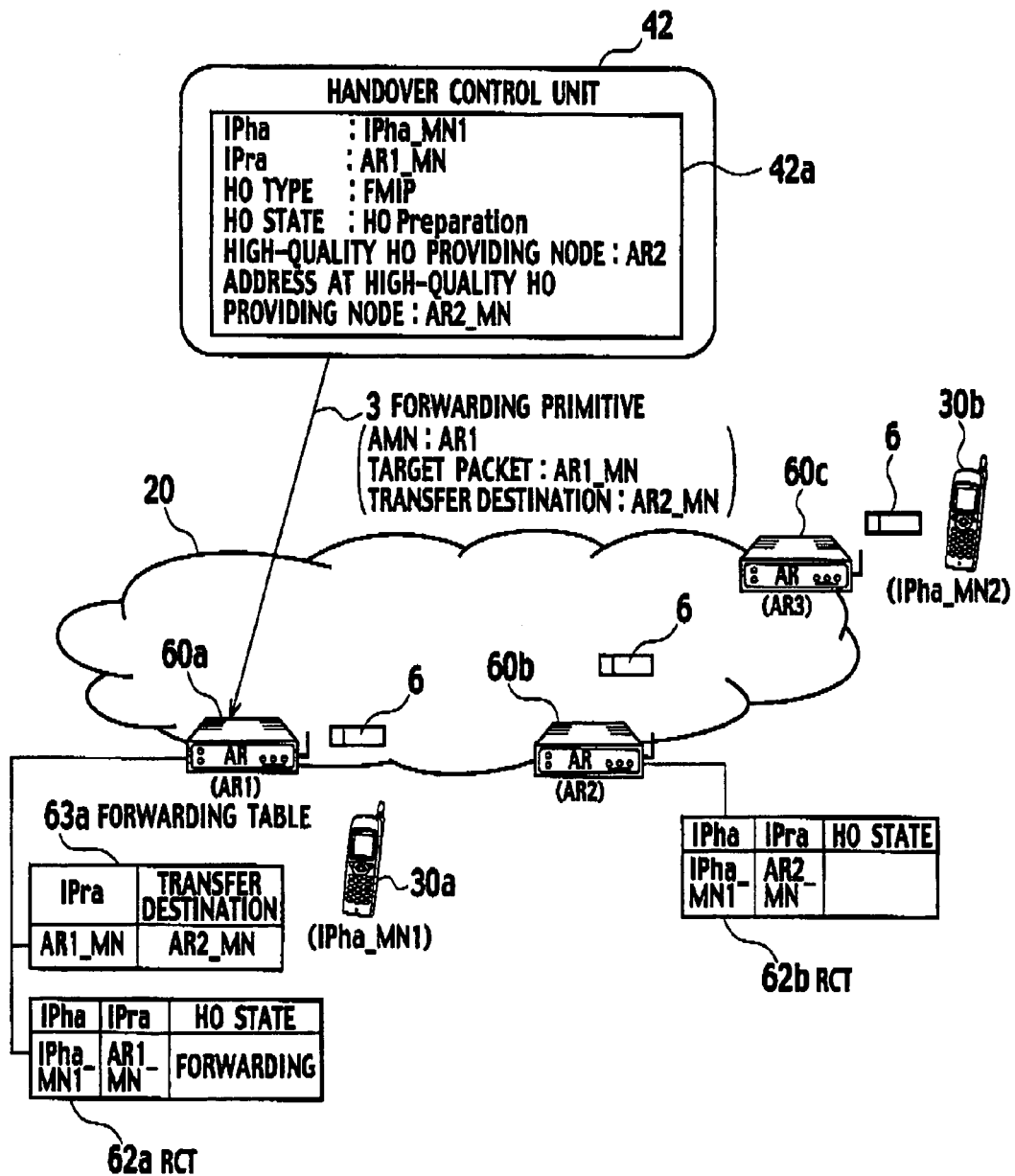
FIG. 10 shows a procedure of forwarding a packet to a handover destination in FMIP according to the embodiment of the present invention.

FIG. 10 shows a procedure for transferring packets addressed to the MN 30a, from the AR 60a (P_AR) to the AR 60b (N_AR) after the registration of the IPra to the AR 60b as the handover destination. Note that this packet transfer may be omitted, and thus may be optionally performed.

The handover control unit 42 instructs the AR 60a (P_AR) to forward (transfer) packets of the MN 30a to the AR 60b (N_AR). More specifically, the handover control unit 42 sends to the packet transfer network 20 the forwarding primitive 3 that defines the "AR1" for the AMN as an instruction target, and defines the "AR2_MN" for the transfer destination.

The transfer unit 61a of the AR 60a receiving the forwarding primitive 3 registers the IPra "AR1_MN" of a packet to be forwarded, in association with the address "AR2_MN" of the AR 60b as the transfer destination, in the forwarding table 63a. Further, the transfer unit 61a sets "forwarding" as the HO state of the MN 30a in the RCT 62a. That is, the transfer unit 61a sets "forwarding" in the field of HO state associated with the IPha "IPha_MN1" and the IPra "AR1_MN" in the RCT 62a.

From now on, the transfer unit 61a references the RCT 62a when receiving packets Then, the transfer unit 61a references the forwarding table 63a based on the "AR1_MN" since the HO state of the packets addressed to the "AR1_MN" registered in the RCT 62a is set to "forwarding". The transfer unit 61a transfers the received packets to the "AR2_MN" in accordance with the forwarding table 63a. In this way, when receiving the packets 6 sent to the MN 30a from the MN 30b as the corresponding node, the transfer unit 61a transfers the packets to the AR 60b. That is, the packets 6 sent to the MN 30a from the MN 30b are transferred to the AR 60b through the AR 60c and AR 60a.

Figure 11:
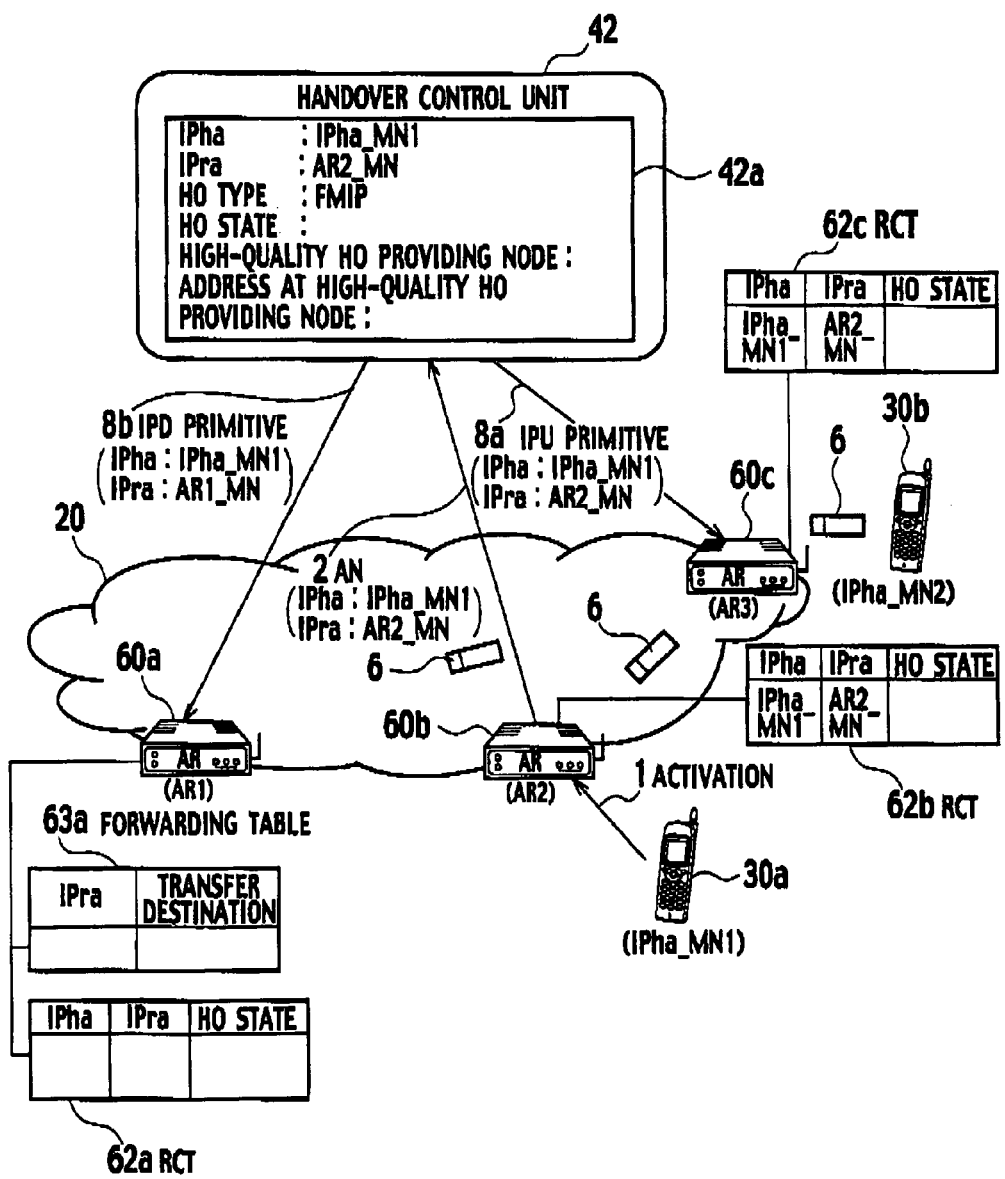
FIG. 11 shows a procedure from when an MN accesses an AR as the handover destination until the completion of the handover in FMIP according to the embodiment of the present invention.

FIG. 11 shows an FMIP handover procedure from when the MN 30a accesses the AR 60b as the handover destination to the completion of the handover. The MN 30a effects handover for switching an accessed AR from the AR 60a to the AR 60b.

The MN 30a sends to the AR 60b (N_AR) newly accessed, the Activation 1 to the effect that the MN has accessed the AR 60b as a result of the handover.

The transfer unit of the AR 60b receiving the Activation 1 notifies the high-quality handover control server 40 that the MN 30a accesses the AR 60b. To be specific, the transfer unit sends the AN 2 including the IPra "AR2_MN" previously assigned with respect to the IPha "IPha_MN1" of the MN 30a.

The handover control unit 42 updates an IPra of the control information storage unit 42a to a new IPra "AR2_MN" based on the received AN 2. Further, the handover control unit 42 instructs the AR 60b to register a new association between the IPha and IPra of the MN 30a in the RCT 62c of the AR 60c. To elaborate, the handover control unit 42 sends to the packet transfer network 20, the IPU primitive Ba instructing to register the "IPha_MN1" in association with the "AR2_MN" assigned at the handover destination.

The transfer unit of the AR 60c receiving the IPU primitive 8a registers an association between the "IPha_MN1" and the "AR2_MN" in the RCT 62c and updates the RCT 62c. Hence, the packets 6 sent from the MN 30b to the MN 30a are transferred to the AR 60b through the AR 60c, not through the AR 60a. Note that the registration to the RCT 62b of the AR 60b has been made, so the handover control unit 42 does not send the IPU primitive 8a to the AR 60b.

When the RCT 62c of the AR 60c is updated, the packets addressed to the MN 30a are no longer transferred to the AR 60a. Thus, the handover control unit 42 instructs the AR 60a to delete information about the MN 30a from the RCT 62a. More specifically, the handover control unit 42 sends to the packet transfer network 20, the IPD primitive 8b instructing to delete the association between the "IPha_MN1" and "AR1_MN".

The transfer unit 61a of the AR 60a receiving the IPD primitive 8b deletes the association between "IPha_MN1" and "AR1_MN" from the RCT 62a. Further, the transfer unit 61a deletes the association between IPra "AR1_MN" and "AR2_MN" from the forwarding table 63a.

Through the above, the processing for handover is completed. Thus, the handover control unit 42 deletes the HO state, the high-quality HO providing node, and the address at the high-quality HO providing node from the control information storage unit 42a.

(Bi-Cast Handover (HO))

Figure 12:
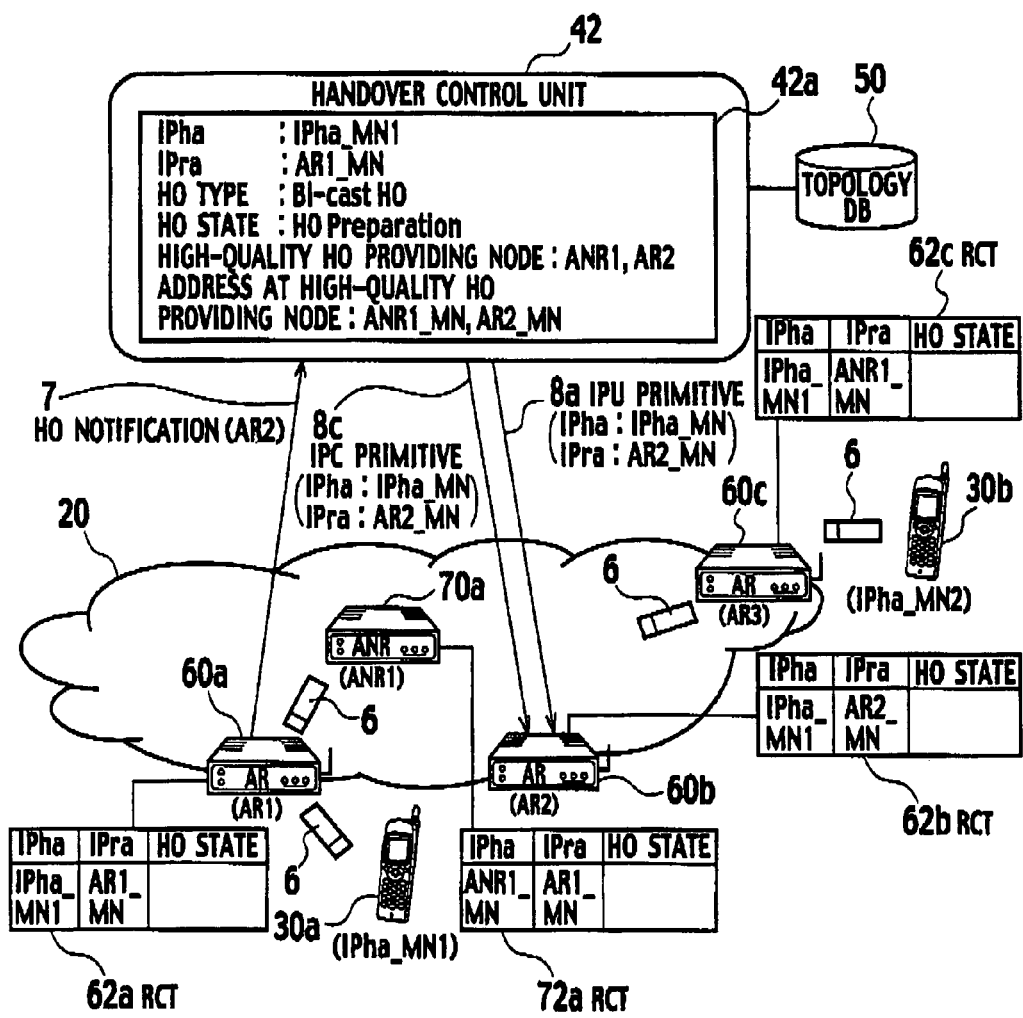
FIG. 12 shows a procedure from handover notification to acquisition of IPra at a handover destination in bi-cast handover according to the embodiment of the present invention.

If the bi-cast handover is selected as a control system, as shown in FIG. 12, "bi-cast handover" is registered in the control information storage unit 42a as the handover control system (HO type) to be provided for the MN 30a. The bi-cast handover is a control system for copying a packet at a node in the packet transfer network 20 to transfer the packets to both the AR 60a accessed before the handover and the AR 60b accessed after the handover. In FIG. 12, since the MN 30a accesses the AR 60a, the "AR1_MN" assigned to the MN 30a by the AR 60a is registered as the IPra in the control information storage unit 42a.

FIG. 12 shows a procedure from the handover notification to the acquisition of the IPra at the handover destination during the bi-cast handover. In the bi-cast handover, processing similar to the processing from the handover notification to the acquisition of the IPra at the handover destination in the HO preparation of FIG. 8 is executed. Note that, in the bi-cast handover, after receiving the handover notification 7, the handover control unit 42 references the topology DB 50 to select a node for copying a packet. More specifically, the handover control unit 42 can select an ANR optimum for copying, based on the topology of the AR 60a currently accessed by the MN 30a and the topology of the packet transfer network 20 stored in the topology DB 50. For example, the handover control unit 42 selects an ANR that has no redundant transfer path of a packet or an ANR closest to the AR 60a accessed by the MN 30a. In this example, the handover control unit 42 selects the ANR 70a.

In the bi-cast handover, the high-quality HO providing node is the ANR 70a for copying a packet and the AR 60b as the handover destination. Thus, the handover control unit 42 registers two addresses: an address "ANR1" of the selected ANR 70a and an address "AR2" of the AR 60b as the notified handover destination, as the high-quality HO providing node in the control information storage unit 42a. Further, the handover control unit 42 registers two addresses: the "ANR1_MN" assigned to the MN 30a at the selected ANR 70a and the IPra "AR2_MN" used by the MN 30a at the AR 60b, in the control information storage unit 42a.

Further, registered in the RCT 62c of the AR 60c are the IPha "IPha_MN1" and the "ANR1_MN" assigned to the MN 30a at the ANR 70a as the IPra in association with each other. Also, the "ANR1_MN" as the IPha and the "AR1_MN" assigned to the MN 30a at the AR 60a currently accessed by the MN 30a as the IPra are registered in the RCT 72a of the ANR 70a, in association with each other.

Note that the RCT 72a can store an association between the "IPha_MN1" and "ANR1_MN" and an association between the "IPha_MN1" and "AR1_MN". In this case, the transfer unit of the ANR 70a can derive the "IPha_MN1" from the "ANR1_MN" set in a packet sent from the AR 60c and in turn, derive "AR1_MN" from the "IPha_MN1" as a transfer destination address.

Figure 13:
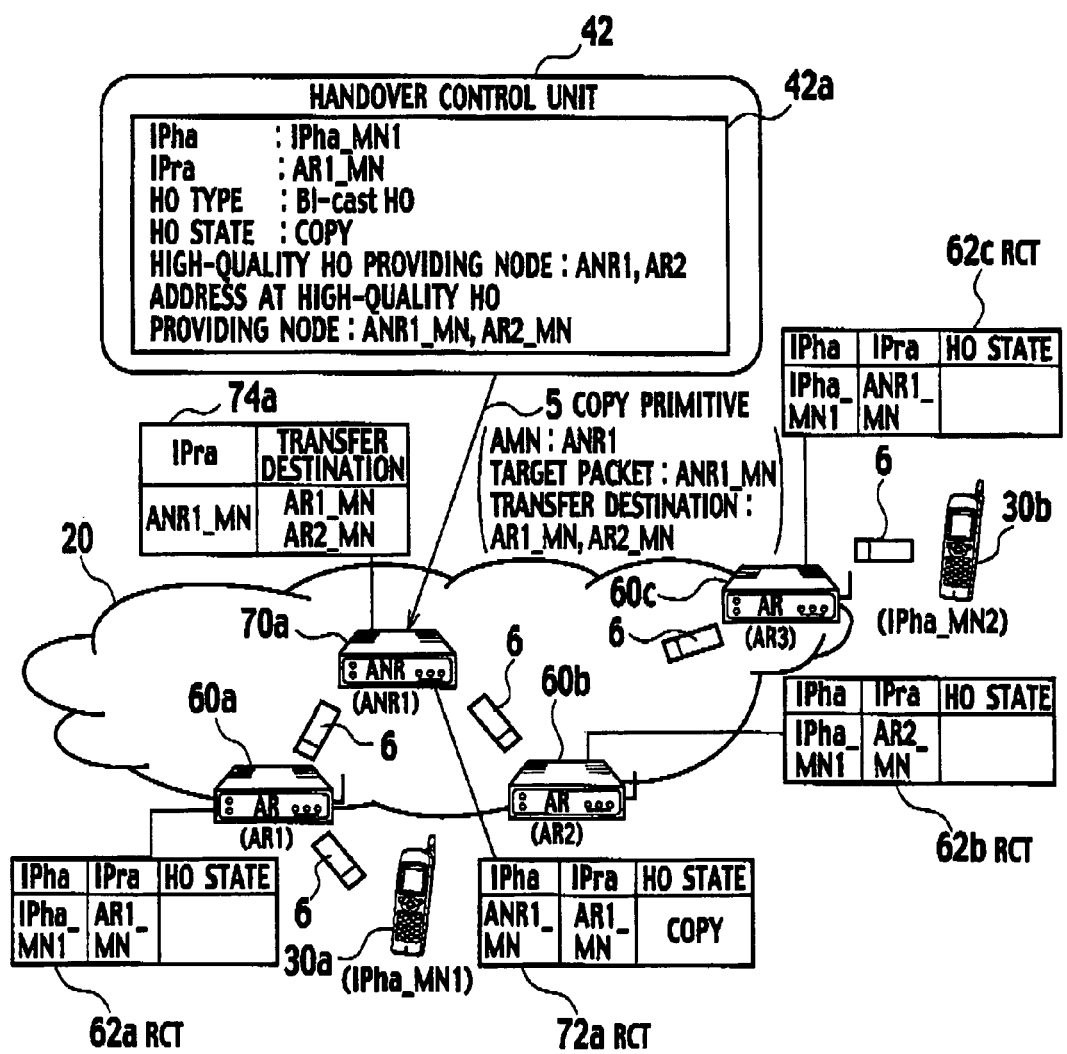
FIG. 13 is a procedure of copying and forwarding a packet after an IPra is registered in an AR as the handover destination according to the embodiment of the present invention.

FIG. 13 shows procedures for copying and transferring packets after the registration of the IPra to the AR 60b as the handover destination. The handover control unit 42 instructs the ANR 70a to copy a packet of the MN 30a and forward (transfer) the packets to the AR 60a (P_AR) and the AR 60b (N_AR).

More specifically, the handover control unit 42 sends to the packet transfer network 20, the copy primitive 5 that defines "ANR1" for the AMN as the instruction target, defines "ANR1_MN" for a target packet as a copying target, and defines the "AR1_MN" and "AR2_MN" as plural transfer destinations.

The transfer unit of the ANR 70a receiving the copy primitive 5 sets "copy" as the HO state in the RCT 72a of the ANR 70a. Further, the transfer unit registers the IPra "ANR1_MN" of a packet to be copied, in association with addresses "AR1_MN" and "AR2_MN" of the ARs 60a, 60b as the transfer destinations, in the copy table 74a of the ANR 70a.

From now on, the transfer unit of the ANR 70a references the RCT 72a when receiving the packet 6. Then, the transfer unit references the copy table 74a since the "copy" is set as the HO state of a packet addressed to the "ANR1_MN" registered in the RCT 72a. The transfer unit copies the received packet 6 in accordance with the copy table 74a. Further, the transfer unit transfers the received packet 6 and the copied packet 6 to the "AR1_MN" and "AR2_MN".

In this way, the transfer unit of the ANR 70a references the RCT 72a to copy the packets 6 when receiving the packets 6 sent to the MN 30a from the MN 30b as the corresponding node. Then, the transfer unit references the copy table 74a to transfer the packets 6 to the ARs 60a and 60b accessed by the MN 30a before and after the handover, respectively.

Figure 14:
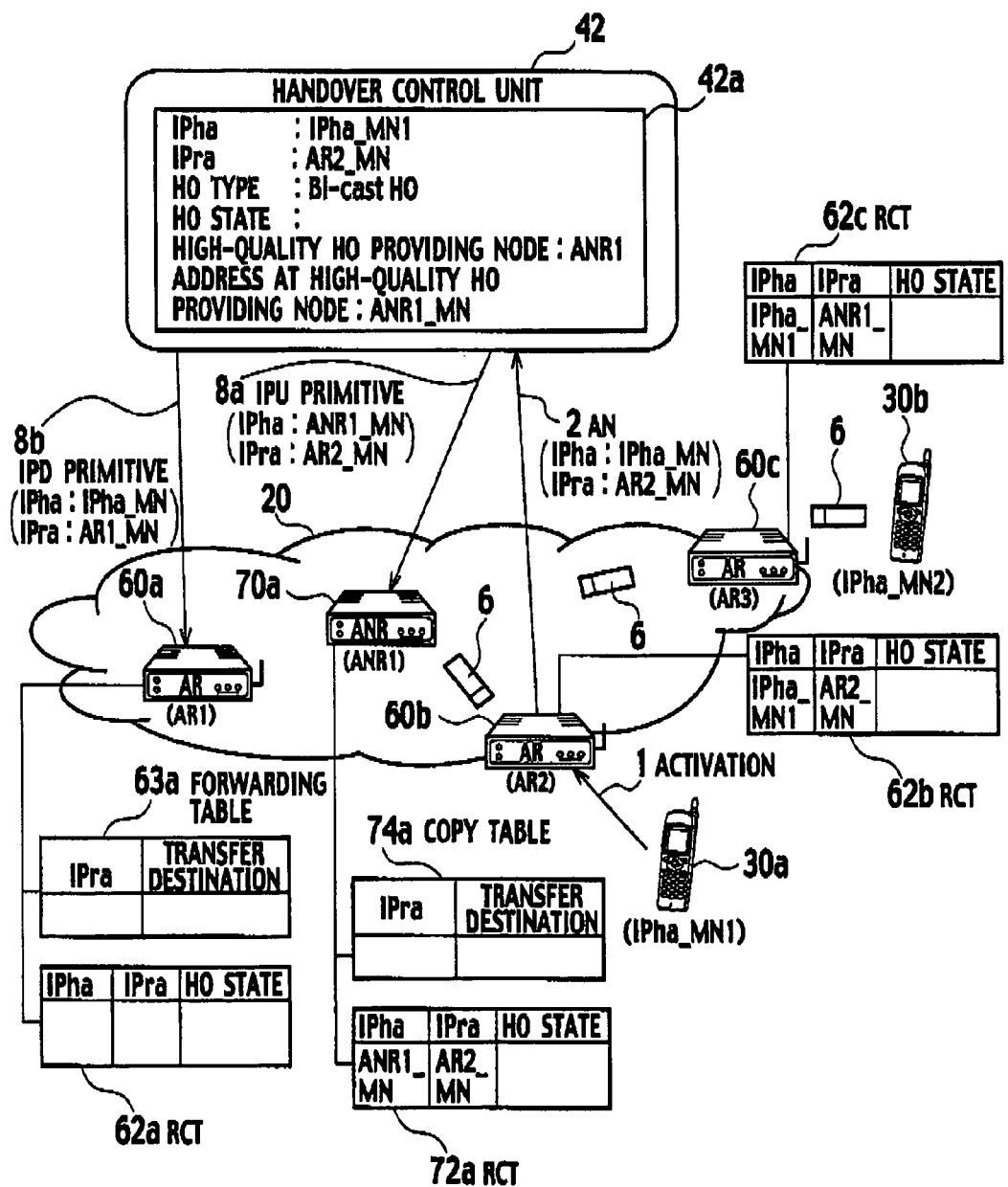
FIG. 14 shows a procedure from when an MN accesses an AR as the handover destination until the completion of the handover in bi-cast handover according to the embodiment of the present invention.

FIG. 14 shows a procedure of bi-cast handover from when the MN 30a accesses the AR 60b as the handover destination to the completion of the handover. Executed in the bi-cast handover is processing similar to the processing from the access to the handover destination in the HO preparation of FIG. 11 to the notification of the AN 2. Besides, in the bi-cast handover, additional processing is executed such that the ANR 70a stops copying a packet to transfer the packet only to the accessed AR 60b after the completion of the handover.

More specifically, the handover control unit 42 deletes the HO state "copy", the high-quality HO providing node "AR 2", and the address "AR2_MN" at the high-quality HO providing node from the control information storage unit 42a, when receiving the AN 2. Further, the handover control unit 42a instructs the ANR 70a to update the RCT 72a. To elaborate, the handover control unit 42 sends to the packet transfer network 20 the IPU primitive 8a instructing to register the "ANR1_MN" and "AR2_MN" in association with each other.

The transfer unit of the ANR 70a receiving the IPU primitive 8a updates the IPra associated with the "ANR1_MN" in the RCT 72a to the "AR2_MN" and deletes "copy" set as the "HO state". Along with the deletion of the HO state "copy" from the RCT 72a, the transfer unit deletes the IPra and transfer destination address set in the copy table 74a.

(ANR Buffering Handover (HO))

Figure 15:
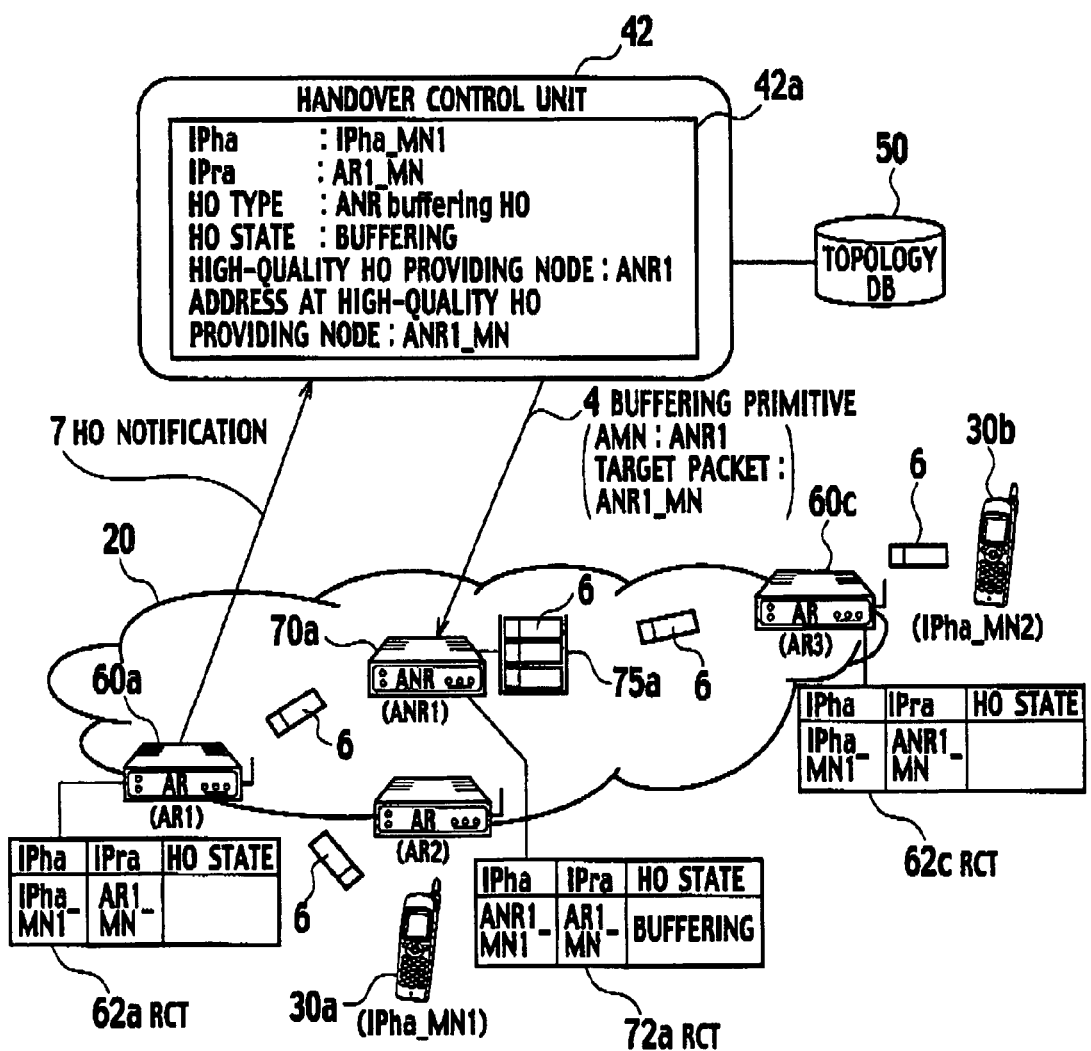
FIG. 15 shows a procedure from ANR handover notification in ANR buffering handover to start of buffering at an ANR according to the embodiment of the present invention.

If the ANR buffering handover is selected as the control system, as shown in FIG. 15, "ANR buffering handover" is registered in the control information storage unit 42a as the handover control system (HO type) to be provided for the MN 30a.

The ANR buffering handover is a control system for buffering packets of the MN 30a during handover at the ANR in the packet transfer network 20 in order to prevent a packet loss during the handover. In FIG. 15, the MN 30a accesses the AR 60a, so the "AR1_MN" assigned to the MN 30a by the AR 60a is registered as the IPra in the control information storage unit 42a.

The handover control unit 42 references the topology DB 50 to select an ANR for buffering packets if the ANR buffering handover is selected as the control system. More specifically, the handover control unit 42 can select an ANR optimum for buffering based on the topology of the AR 60a currently accessed by the MN 30a and the topology of the packet transfer network 20 stored in the topology DB 50. For example, the handover control unit 42 selects an ANR that has no redundant transfer path of a packet or an ANR closest to the AR 60a accessed by the MN 30a. In this example, the handover control unit 42 selects the ANR 70a.

Then, the handover control unit 42 registers the address "ANR1" of the selected ANR 70a as the high-quality HO providing node, in the control information storage unit 42a, and registers the "ANR1_MN" assigned to the MN 30a at the selected ANR 70a as the high-quality HO providing node.

Further, the IPha "IPha_MN1" and "ANR1_MN" assigned as the IPra to the MN 30a at the ANR 70a are registered in the RCT 62c of the AR 60c in association with each other. Also, registered in the RCT 72a of the ANR 70a are the "ANR1_MN" assigned to the MN 30a at the ANR 70a as the IPha and "AR1_MN" assigned to the MN 30a at the AR 60a currently accessed by the MN 30a as the IPra.

FIG. 15 shows a procedure of ANR buffering handover from the handover notification to the start of buffering at the ANR 70a. The transfer unit 61a of the AR 60a detects that the MN 30a comes near to handover based on the wireless information about the wireless communication of the MN 30a. The transfer unit 61a sends the handover notification 7 to the high-quality handover control server 40.

The handover control unit 42 of the high-quality handover control server 40 receiving the handover notification 7 sets the "buffering" as the HO state of the control information storage unit 42*a*. Then, the handover control unit 42 instructs the ANR 70*a* to buffer packets addressed to the MN 30*a*. To elaborate, the handover control unit 42 sends to the packet transfer network 20, the buffering primitive 4 that defines "ANR1" for the AMN as an instruction target, and defines "ANR1_MN" for a target packet as a buffering target.

The transfer unit of the ANR 70*a* receiving the buffering primitive 4 sets "buffering" as the HO state of the MN 30*a* of the RCT 72*a*. That is, the transfer unit sets "buffering" in the field of HO state associated with the IPha "ANR1_MN" and the IPra "AR1_MN" in the RCT 72*a*.

From now on, the transfer unit of the ANR 70*a* references the RCT 72*a* when receiving the packets, and stores the packets addressed to the IPha "ANR1_MN" registered in the RCT 72*a*, in the buffer 75*a* of the ANR 70*a*. In this way, the transfer unit of the ANR 70*a* stores and buffers the packets 6 sent from the MN 30*b* as the corresponding node to the MN 30*a* in the buffer 75*a* of the ANR 70*a*.

Figure 16:
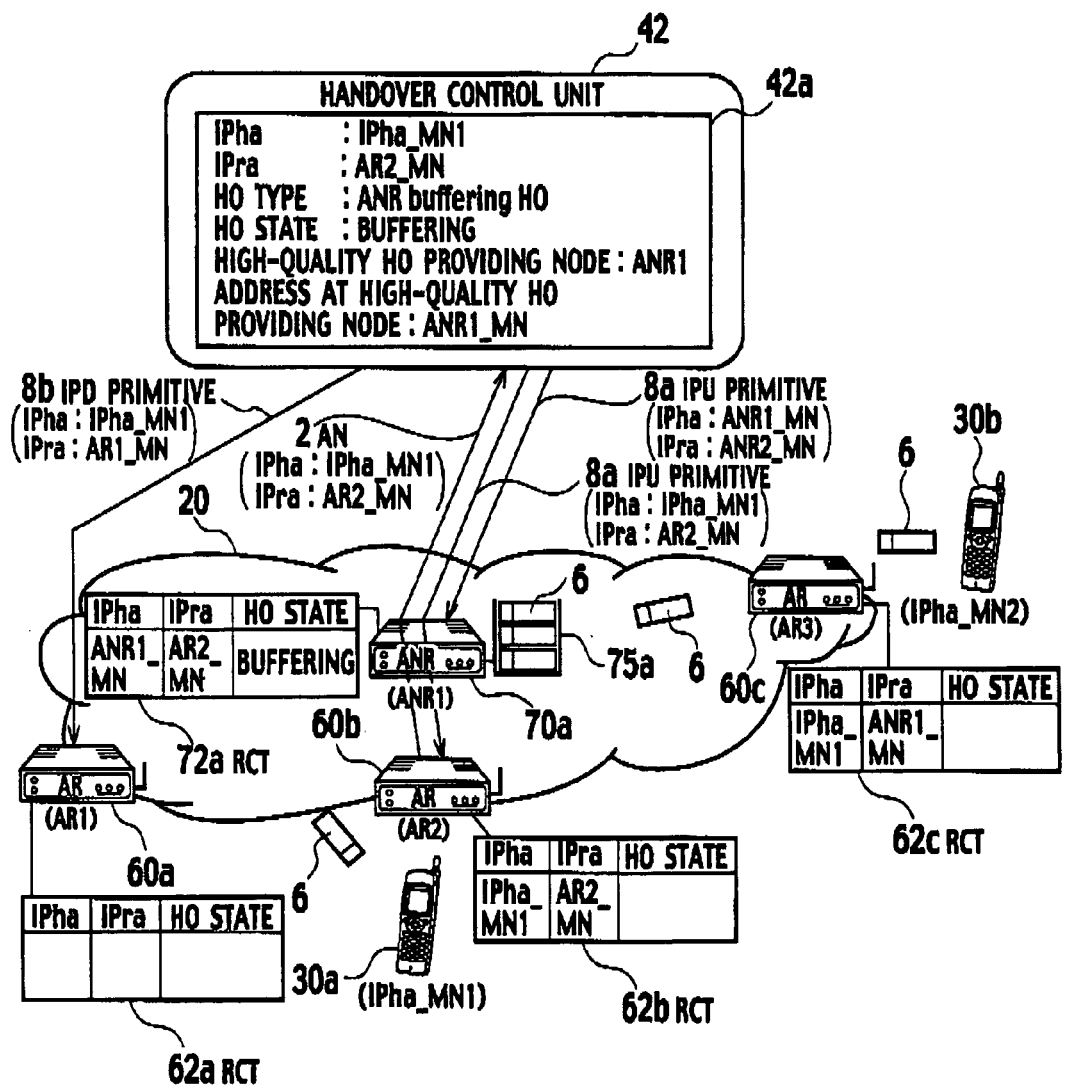
FIG. 16 shows a procedure from start of buffering to completion of the buffering in the ANR buffering handover according to the embodiment of the present invention.

FIG. 16 shows a procedure from the start of buffering to the completion of the handover in the ANR buffering handover. The MN 30*a* effects handover for switching an accessed AR from the AR 60*a* to AR 60*b*. The MN 30*a* sends the Activation 1 to the AR 60*b* (N_AR) newly accessed.

The transfer unit of the AR 60*b* receiving the Activation 1 temporarily assigns the IPra "AR2_MN" to the MN 30*a*. The transfer unit sends the AN 2 including the IPra "AR2_MN" assigned with respect to the IPha "IPha_MN1" of the MN 30*a* to the high-quality handover control server 40.

The handover control unit 42 updates the IPra of the control information storage unit 42*a* to the IPra "AR2_MN" assigned by the AR 60*b* (N_AR) based on the received AN 2. Then, the handover control unit 42 instructs the AR 60*b* to register the IPra and IPha of the MN 30*a* in the RCT 62*b* of the AR 60*b*. More specifically, the handover control unit 42 sends to the packet transfer network 20, the IPU primitive 8*a* instructing to register the "IPha_MN1" in association with the "AR2_MN". The transfer unit of the AR 60*b* receiving the IPU primitive 8*a* registers an association between the "IPha_MN1" and the "AR2_MN" in the RCT 62*b*.

Next, the handover control unit 42 instructs the ANR 70*a* to update the RCT 72*a*. More specifically, the handover control unit 42 sends to the packet transfer network 20, the IPU primitive 8*a* instructing to register an association between the "ANR1_MN" and the "AR2_MN". The transfer unit of the ANR 70*a* receiving the IPU primitive ea updates the IPra associated with the "ANR1_MN" to the "AR2_MN" in the RCT 72*a*.

Next, the handover control unit 42 instructs the AR 60*a* to delete information about the MN 30*a* from the RCT 62*a*. More specifically, the handover control unit 42 sends to the packet transfer network 20, the IPD primitive 8*b* instructing to delete the association between the "IPha_MN1" and the "AR1_MN". The transfer unit 61*a* of the AR 60*a* receiving the IPD primitive 8*b* deletes the association between the "IPha_MN1" and the "AR1_MN" from the RCT 62*a*.

Figure 17:
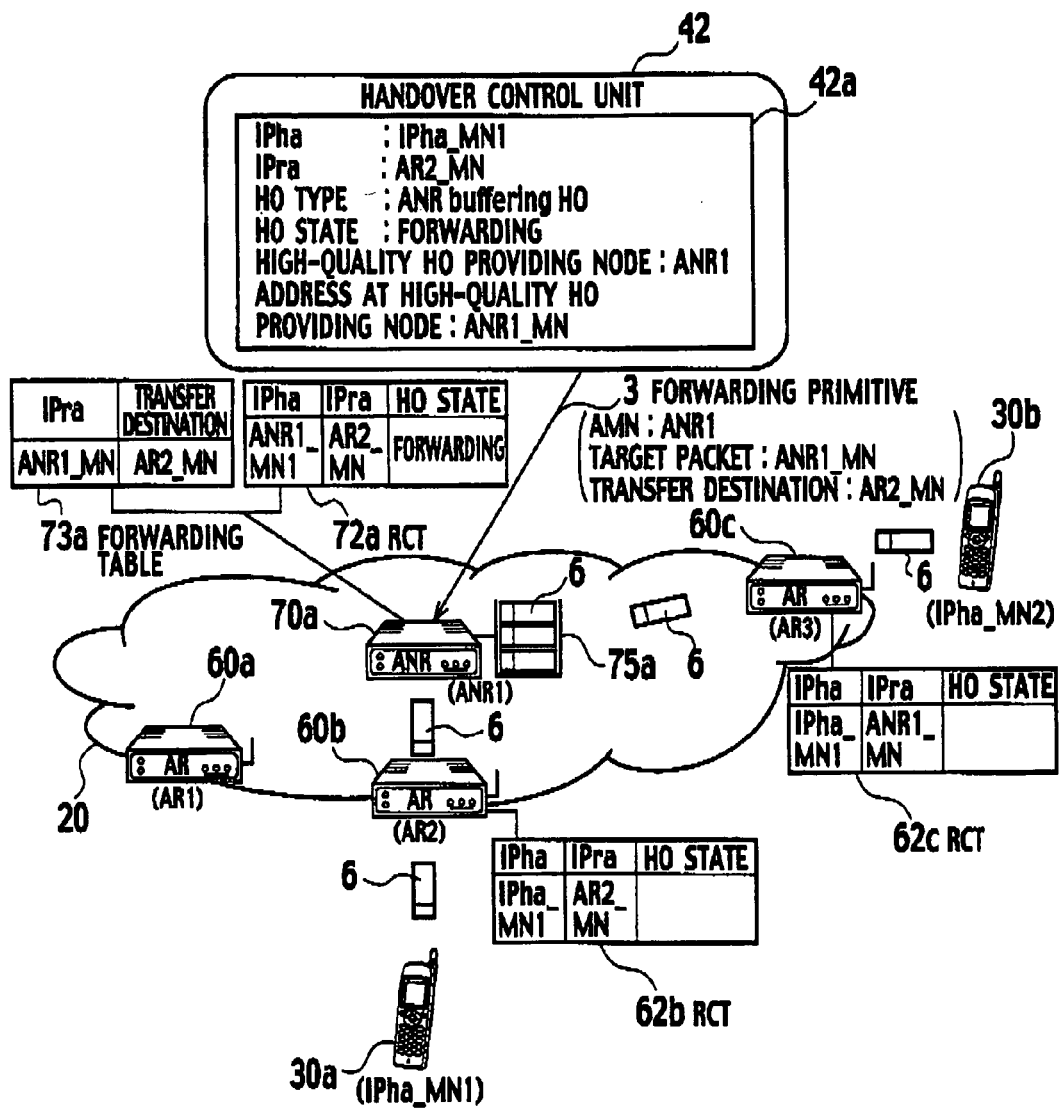
FIG. 17 shows a procedure of forwarding buffered packets in ANR buffering handover according to the embodiment of the present invention.

FIG. 17 shows a procedure for transferring buffered packets upon the ANR buffering handover. The handover control unit 42 updates the HO state in the control information storage unit 42*a* from the "buffering" to the "forwarding".

Further, the handover control unit 42 instructs the ANR 70*a* to forward (transfer) the packets addressed to the MN 30*a* and buffered at the ANR 70*a* to the AR 60*b* (N_AR). More specifically, the handover control unit 42 sends to the packet transfer network 20, the forwarding primitive 3 that defines the "ANR1" for the AMN as an instruction target, defines the "ANR1_MN" for the target packet as a forwarding target, and defines the "AR2_MN" registered in the control information storage unit 42*a* as the IPra, as the transfer destination.

The transfer unit of the ANR 70*a* receiving the forwarding primitive 3 registers the IPra "ANR1_MN" of the packet to be forwarded in association with the address "AR2_MN" of the AR 60*b* as the transfer destination. Further, the transfer unit of the ANR 70*a* updates the HO state of the MN 30*a* at the RCT 72*a* from the "buffering" to "forwarding". That is, the transfer unit sets "forwarding" in the field of the HO state associated with the IPha "ANR1_MN" and IPra "AR2_MN" in the RCT 72*a*. The transfer unit of the ANR 70*a* transfers the packets 6 to the MN 30*a* stored in the buffer 75*a*, to the AR 60*b* with reference to the RCT 72*a*.

Note that the processing from the start of buffering to the completion of the handover as shown in FIG. 16 and the processing of transferring the buffered packets as shown in FIG. 17 may be performed in parallel. More specifically, the handover control unit 42 sends the IPU primitive 8*a* in response to the reception of the AN 2 concurrently with the transmission of the forwarding primitive 3 of FIG. 17. Alternatively, the handover control unit 42 may set the forwarding primitive 3 as an option of the IPU primitive 8*a*, send the primitive, and issue instructions to the ANR 70*a* using one primitive.

(Handover Controlling Method)

Figure 18:
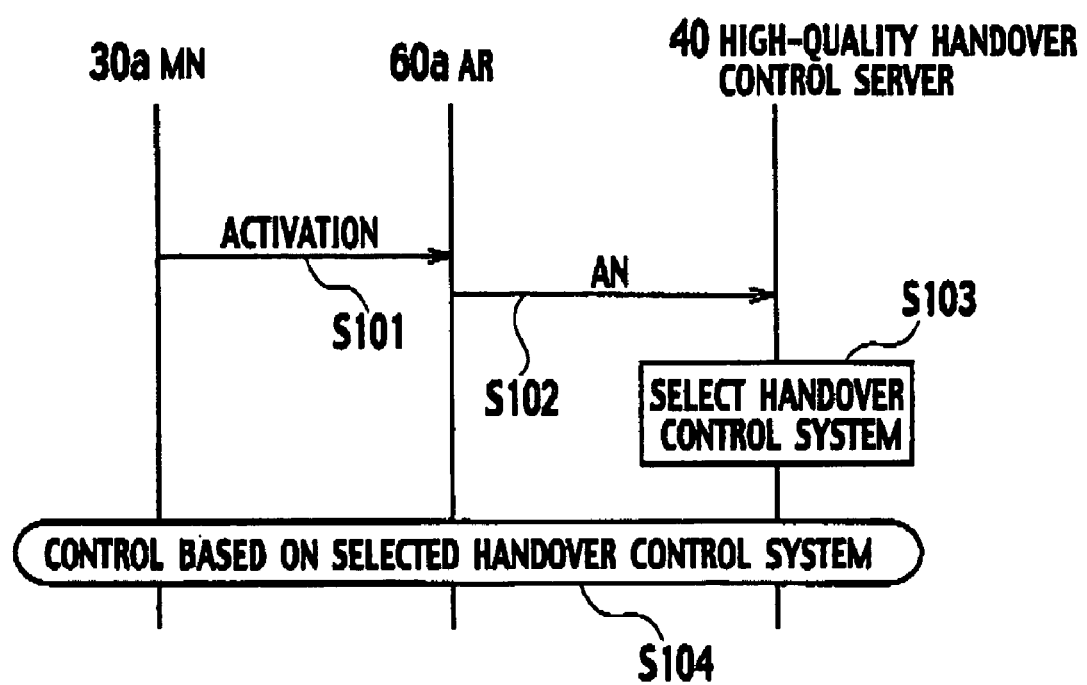
FIG. 18 is a sequence diagram showing a procedure of a handover controlling method according to an embodiment of the present invention.

FIG. 18 shows a procedure of a handover controlling method. Accessing the AR 60*a*, the MN 30*a* creates the Activation 1 that defines a QoS class required by the MN 30*a* for the next communication and sends the Activation 1 to the packet transfer network 20 (S101).

The AR 60*a* receiving the Activation 1 sends the AN 2 that defines the QoS class set in the received Activation 1 to the high-quality handover control server 40 (S102).

The high-quality handover control server 40 receiving the AN 2 selects a handover control system based on a QoS class in the received AN 2 (S103). Then, the high-quality handover control server 40 effects the handover control in accordance with the selected handover control system (S104).

(Effects)

According to the mobile communication system 100, the high-quality handover control server 40, and the handover controlling method, a handover control system can be selected based on the QoS, so the handover control commensurate with the QoS can be provided. That is, the mobile communication system 100 enables a handover control system suitable for each QoS.

In addition, in the mobile communication system 100, the handover control unit 42 is independent of the packet transfer network 20, and the handover control unit 42 issues an instruction to the packet transfer network 20 in accordance with the selected handover control system. Hence, a handover control suitable for the QoS may be flexibly provided.

Then, the ARs 60*a* to 60*c*, the ANRs 70*a*, 70*b*, and Rs 80*a* to 80*c* in the packet transfer network 20 are imparted with forwarding, buffering, and copy functions; those functions are combined to thereby attain the handover control meeting the QoS desired by the MNs 30*a*, 30*b* or the QoS commensurate with the traffic type.

Further, the handover control unit 42 can issue an instruction using a primitive as a message usable in common among the plural handover control systems. Hence, the handover control unit 42 can flexibly make various types of handover control in accordance with various types of QoS through the common platform, and NCPF 10. If the new QoS is set, the mobile communication system 100 uses the function previously given by the packet transfer network 20, and the primitive predefined in the mobile communication system 100 in combination, whereby it is possible to conform to the new QoS only by activating the new handover control system without adding a new function.

Further, the mobile communication system 100 includes the handover control system list 41 storing a QoS in association with a handover control system, and the handover control unit 42 can readily select a handover control system with reference to the handover control system list 41.

What is claimed is:

1. A mobile communication system comprising:
    a packet transfer network configured to be accessed by a mobile node, the packet transfer network including an anchor router connected to at least a first access router and a second access router, wherein the second access router does not support a protocol associated with a first handover control system supported by the first access router; and
    a handover control unit through which traffic packets are not routed provided separately from the packet transfer network and configured to instruct of a handover from the first access router to the second access router in to the packet transfer network,
    wherein the handover control unit is configured to:
        select the first handover control system from a plurality of handover control systems for switching from the first access router to the second access router in accordance with a service quality corresponding to the mobile node,
        determine types of a primitive message different from the protocol associated with the first handover control system and common to the first and second access routers that indicates a process executable at the first and second access routers and the anchor router, destinations of the primitive message, and transmission timing of the primitive message in accordance with the first handover control system, and
        instruct of the handover by transmitting the primitive message to the first and second access routers and the anchor router included in the packet transfer network in accordance with the determined types, the determined destinations and the determined transmission timing.

2. The mobile communication system of claim 1, further comprising:
    a control system storage unit configured to store a service quality in association with each of the plurality of handover control systems, wherein the handover control unit selects the first handover control system from the plurality of handover control systems stored in the control system storage unit based on the service quality corresponding to the mobile node.

3. The mobile communication system of claim 1, wherein the type of the primitive message includes at least one of a forwarding primitive indicating that packets destined to the mobile node are to be forwarded during handover, a buffering primitive indicating that packets destined to the mobile node are to be buffered during handover, and a copy primitive indicating that packets destined to the mobile node are to be copied and transferred to multiple access routers during handover.

4. The mobile communication system of claim 3, wherein the handover control unit is configured to
    receive a notification from the mobile node that the mobile node is initiating a handover procedure from the first access router to the second access router,
    transmit the buffering primitive to the first access router instructing the first access router to buffer received packets destined for the mobile node,
    receive a notification from the mobile node that handover to the second access router is complete, and
    transmit the forwarding primitive to the first access router instructing the first access router to transfer the buffered received packets to the second access router.

5. The mobile communication system of claim 3, wherein the handover control unit is configured to
    receive a notification from the mobile node that the mobile node is initiating a handover procedure from the first access router to the second access router, and
    transmit the forwarding primitive to the first access router instructing the first access router to immediately transfer packets received at the first access router, which are destined to the mobile node, to the second access router.

6. A handover controller comprising:
    a handover control unit through which traffic packets are not routed provided separately from a packet transfer network and configured to instruct of a handover from a first access router to a second access router of the packet transfer network to the packet transfer network,
    wherein the handover control unit is configured to:
        select a first handover control system from a plurality of handover control systems for switching from the first access router to the second access router accessed by a mobile node in accordance with a service quality corresponding to the mobile node, wherein the second access router does not support a protocol associated with the first handover control system supported by the first access router,
        determine types of a primitive message different from the protocol associated with the first handover control system and common to the first and second access routers that indicates a process executable at the first and second access routers and an anchor router in the packet transfer network which includes the plurality of access routers and the anchor router connected to at least two of the plurality of access routers, destinations of the primitive message, and transmission timing of the primitive message in accordance with the first handover control system, and
        instruct of the handover by transmitting the primitive message to the first and second access routers and the anchor router included in the packet transfer network in accordance with the determined types, the determined destinations and the determined transmission timing.

7. The handover controller of claim 6, wherein the types of the primitive message includes at least one of a forwarding primitive indicating that packets destined to the mobile node are to be forwarded during handover, a buffering primitive indicating that packets destined to the mobile node are to be buffered during handover, and a copy primitive indicating that packets destined to the mobile node are to be copied and transferred to multiple access routers during handover.

8. The handover controller of claim 7, wherein the handover control unit is configured to
    receive a notification from the mobile node that the mobile node is initiating a handover procedure from a first access router to a second access router,
    transmit the buffering primitive to the first access router instructing the first access router to buffer received packets destined for the mobile node,
    receive a notification from the mobile node that handover to the second access router is complete, and transmit the forwarding primitive to the first access router instructing the first access router to transfer the buffered received packets to the second access router.

9. The handover controller of claim 7, wherein the handover control unit is configured to
receive a notification from the mobile node that the mobile node is initiating a handover procedure from the first access router to the second access router, and
transmit the forwarding primitive to the first access router instructing the first access router to immediately transfer packets received at the first access router, which are destined to the mobile node, to the second access router.

10. A handover controlling method comprising:
selecting, at a handover control unit through which traffic packets are not routed provided separately from a packet transfer network, a first handover control system for switching from a first access router to a second access router accessed by a mobile node in accordance with a service quality corresponding to the mobile node, wherein the second access router does not support a protocol associated with the first handover control system that is supported by the first access router;
determining, at the handover control unit, types of a primitive message different from the protocol associated with the first handover control system and common to the first and second access routers that indicates a process executable at the first and second access routers and an anchor router in the packet transfer network;
determining, at the handover control unit, destinations of the primitive message;
determining, at the handover control unit, a transmission timing of the primitive message in accordance with the first handover control system; and
instructing of the handover, from the handover control unit to the first and second access routers and the anchor router included in the packet transfer network, by transmitting the primitive message in accordance with the determined types, the determined destinations and the determined transmission timing.

11. The handover control method of claim 10, wherein the types of the primitive message includes at least one of a forwarding primitive indicating that packets destined to the mobile node are to be forwarded during handover, a buffering primitive indicating that packets destined to the mobile node are to be buffered during handover, and a copy primitive indicating that packets destined to the mobile node are to be copied and transferred to multiple access routers during handover.

12. The handover control method of claim 11, further comprising:
receiving, at the handover control unit, a notification from the mobile node that the mobile node is initiating a handover procedure from the first access router to the second access router;
transmitting, from the handover control unit, the buffering primitive to the first access router instructing the first access router to buffer received packets destined for the mobile node;
receiving, at the handover control unit, a notification from the mobile node that handover to the second access router is complete; and
transmitting, from the handover control unit, the forwarding primitive to the first access router instructing the first access router to transfer the buffered received packets to the second access router.

13. The handover control method of claim 11, further comprising:
receiving, at the handover control unit, a notification from the mobile node that the mobile node is initiating a handover procedure from the first access router to the second access router; and
transmitting, from the handover control unit, the forwarding primitive to the first access router instructing the first access router to immediately transfer packets received at the first access router, which are destined to the mobile node, to the second access router.

\* \* \* \* \*